US012747374B2

(12) United States Patent
Kim et al.

(10) Patent No.: US 12,747,374 B2
(45) **Date of Patent: *Sep. 29, 2026**

(54) ADHESIVE COMPOSITION, ADHESIVE FILM PREPARED FROM THE SAME AND DISPLAY MEMBER INCLUDING THE SAME

(71) Applicants: SAMSUNG SDI CO., LTD., Yongin-si (KR); SAMSUNG ELECTRONICS CO., LTD., Suwon-si (KR)

(72) Inventors: Ji Ho Kim, Uiwang-si (KR); Hyung Rang Moon, Uiwang-si (KR); Il Jin Kim, Uiwang-si (KR); Byeong Do Kwak, Uiwang-si (KR); Jee Hee Kim, Uiwang-si (KR); Sung Hyun Mun, Uiwang-si (KR); Seon Hee Shin, Uiwang-si (KR); Gwang Hwan Lee, Uiwang-si (KR); Woo Jin Lee, Uiwang-si (KR); Eun Hwa Lee, Uiwang-si (KR); Ik Hwan Cho, Uiwang-si (KR); Jae Hyun Han, Uiwang-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,818

(22) Filed: Feb. 28, 2022

(65) Prior Publication Data

US 2022/0298385 A1 Sep. 22, 2022

Related U.S. Application Data

(63) Continuation of application No. 16/933,853, filed on Jul. 20, 2020, now Pat. No. 12,297,382, which is a (Continued)

(30) Foreign Application Priority Data

Nov. 1, 2014 (KR) ........................ 10-2014-0150799
Nov. 3, 2014 (KR) ........................ 10-2014-0151571
Nov. 11, 2014 (KR) ........................ 10-2014-0156462

(51) Int. Cl.
*C09J 7/10* (2018.01)
*C08L 53/02* (2006.01)
(Continued)

(52) U.S. Cl.
CPC ................ *C09J 7/10* (2018.01); *C08L 53/02* (2013.01); *C09J 7/00* (2013.01); *C09J 7/22* (2018.01);
(Continued)

(58) Field of Classification Search
None
See application file for complete search history.

(56) References Cited

U.S. PATENT DOCUMENTS 5,162,432 A 11/1992 Machado
6,291,593 B1 9/2001 Cheng
(Continued)

FOREIGN PATENT DOCUMENTS

CN 1763112 A 4/2006
CN 1764679 A 4/2006
(Continued)

OTHER PUBLICATIONS

Machine translation of WO 2014091927 (Year: 2014).*
(Continued)

*Primary Examiner* — Alicia Chevalier
*Assistant Examiner* — Thomas A Mangohig
(74) *Attorney, Agent, or Firm* — Womble Bond Dickinson (US) LLP

(57) ABSTRACT

An adhesive film has an average slope of about −9.9 to about 0, as measured over a temperature range of about −20° C. to
(Continued)

about 80° C. in a graph depicting a temperature-dependent storage modulus distribution of the adhesive film where the x-axis represents temperature (° C.) and the y-axis represents storage modulus (kPa). The adhesive film also has a storage modulus at about 80° C. of about 10 kPa to about 1,000 kPa.

26 Claims, 2 Drawing Sheets

Related U.S. Application Data continuation of application No. 14/929,160, filed on Oct. 30, 2015, now Pat. No. 10,745,597.

(51) Int. Cl.

| | |
|---|---|
| ***C09J 7/00*** | (2018.01) |
| ***C09J 7/22*** | (2018.01) |
| ***C09J 7/38*** | (2018.01) |
| ***C09J 133/06*** | (2006.01) |
| ***C09J 133/08*** | (2006.01) |
| *C09J 4/00* | (2006.01) |

(52) U.S. Cl.

CPC ............. *C09J 7/38* (2018.01); *C09J 133/066* (2013.01); *C09J 133/08* (2013.01); *C09J 4/00* (2013.01); *C09J 2203/318* (2013.01); *C09J 2301/312* (2020.08); *C09J 2433/00* (2013.01)

(56) References Cited

U.S. PATENT DOCUMENTS

| | | | | |
|---|---|---|---|---|
| 6,771,335 | B2 | 8/2004 | Kimura et al. | |
| 10,745,597 | B2 | 8/2020 | Kim et al. | |
| 2001/0021452 | A1* | 9/2001 | Kishioka | C08G 18/809 428/343 |
| 2002/0142158 | A1* | 10/2002 | Ono | C09J 4/00 428/355 R |
| 2002/0193487 | A1* | 12/2002 | Sakurai | C09K 21/14 524/417 |
| 2005/0154140 | A1 | 7/2005 | Hong et al. | |
| 2005/0181148 | A1 | 8/2005 | Kim et al. | |
| 2006/0035076 | A1 | 2/2006 | Kim et al. | |
| 2007/0149715 | A1 | 6/2007 | Lee et al. | |
| 2009/0179035 | A1 | 7/2009 | Agarwal et al. | |
| 2009/0298969 | A1 | 12/2009 | Attarwala et al. | |
| 2010/0209703 | A1 | 8/2010 | Takarada et al. | |
| 2012/0100359 | A1 | 4/2012 | Kishioka et al. | |
| 2012/0329970 | A1 | 12/2012 | Kishioka et al. | |
| 2013/0040123 | A1 | 2/2013 | Cho et al. | |
| 2013/0052457 | A1 | 2/2013 | Inui et al. | |
| 2013/0236674 | A1 | 9/2013 | Kim et al. | |
| 2014/0016067 | A1 | 1/2014 | Yoon et al. | |
| 2014/0065416 | A1 | 3/2014 | Niwa et al. | |
| 2014/0139447 | A1 | 5/2014 | Kang et al. | |
| 2014/0162044 | A1 | 6/2014 | Lee et al. | |
| 2014/0162057 | A1 | 6/2014 | Cho et al. | |
| 2014/0267950 | A1 | 9/2014 | Kang et al. | |
| 2015/0367602 | A1 | 12/2015 | Iwaya et al. | |
| 2016/0122600 | A1 | 5/2016 | Moon et al. | |
| 2016/0177146 | A1 | 6/2016 | Mun et al. | |
| 2017/0002237 | A1 | 1/2017 | Cho et al. | |
| 2017/0015880 | A1 | 1/2017 | Kim et al. | |
| 2022/0177735 | A1 | 6/2022 | Kim et al. | |

FOREIGN PATENT DOCUMENTS

| | | | | |
|---|---|---|---|---|
| CN | 101679709 | A | 3/2010 | |
| CN | 102585721 | A | 7/2012 | |
| CN | 102753635 | A | 10/2012 | |
| CN | 102855822 | | 1/2013 | |
| CN | 102933677 | A | 2/2013 | |
| CN | 103160217 | A | 6/2013 | |
| CN | 103328526 | | 9/2013 | |
| CN | 103865411 | A | 6/2014 | |
| CN | 103897620 | A | 7/2014 | |
| CN | 104231952 | A | 12/2014 | |
| CN | 106010318 | A | 10/2016 | |
| JP | H09-278837 | A | 10/1997 | |
| JP | 2002-348546 | A | 12/2002 | |
| JP | 2006-301572 | | 11/2006 | |
| JP | 2007-176542 | A | 7/2007 | |
| JP | 2008-037101 | A | 2/2008 | |
| JP | 4750410 | B2 | 8/2011 | |
| JP | 2012-128391 | A | 7/2012 | |
| KR | 10-2005-0056158 | A | 6/2005 | |
| KR | 10-2007-0055363 | A | 5/2007 | |
| KR | 10-2008-0052897 | A | 6/2008 | |
| KR | 10-2010-0002638 | A | 1/2010 | |
| KR | 10-2010-0075726 | A | 7/2010 | |
| KR | 10-2010-0105984 | A | 10/2010 | |
| KR | 10-2012-0125699 | A | 11/2012 | |
| KR | 10-2014-0076425 | A | 6/2014 | |
| KR | 10-2014-0085259 | A | 7/2014 | |
| KR | 10-2014-0085299 | A | 7/2014 | |
| KR | 10-2014-0090737 | A | 7/2014 | |
| KR | 10-2014-0102132 | A | 8/2014 | |
| KR | 10-2014-0111884 | A | 9/2014 | |
| KR | 10-2014-0148278 | A | 12/2014 | |
| KR | 10-2016-0030235 | A | 3/2016 | |
| TW | 200724635 | A | 7/2007 | |
| TW | 201300474 | A | 1/2013 | |
| TW | 201300478 | A | 1/2013 | |
| TW | 201420715 | A | 6/2014 | |
| TW | 2014-30085 | A | 8/2014 | |
| TW | 201430091 | A | 8/2014 | |
| WO | WO 2012/124908 | A2 | 9/2012 | |
| WO | WO 2012/138030 | A1 | 10/2012 | |
| WO | WO 2013/176364 | A1 | 11/2013 | |
| WO | WO 2014/027788 | A1 | 2/2014 | |
| WO | WO-2014091927 | A1 * | 6/2014 | C08F 220/18 |
| WO | WO 2015/155844 | A1 | 10/2015 | |

OTHER PUBLICATIONS

U.S. Final Office Action dated Dec. 24, 2021, issued in U.S. Appl. No. 17/068,155 (15 pages).

U.S. Office Action dated Dec. 7, 2021, issued in U.S. Appl. No. 16/942,678 (14 pages).

U.S. Advisory Action dated Aug. 23, 2021, issued in U.S. Appl. No. 16/942,678 (5 pages).

U.S. Office Action dated Jul. 7, 2021, issued in U.S. Appl. No. 17/068, 155 (14 pages).

U.S. Final Office Action dated Jun. 11, 2021, issued in U.S. Appl. No. 16/942,678 (13 pages).

U.S. Restriction Requirement dated Dec. 22, 2020, issued in U.S. Appl. No. 16/942,678 (6 pages).

U.S. Office Action dated Feb. 22, 2021, issued in U.S. Appl. No. 16/942,678 (15 pages).

International Search Report for corresponding PCT Application No. PCT/KR2015/011603, dated Mar. 31, 2016, with English Translation (4 pages).

Written Opinion for corresponding PCT Application No. PCT/KR2015/011603, dated Mar. 31, 2016, with English Translation (5 pages).

Taiwan Office action dated Sep. 9, 2016, corresponding to Taiwanese Patent Application No. 104135962 (7 pages).

TIPO Office Action dated Dec. 7, 2016, corresponding to Taiwanese Patent Application No. 105110178 (13 pages).

KIPO Office Action dated May 22, 2017 for Korean Patent Application No. 10-2015-0093811 (8 pages).

U.S. Office Action dated Jul. 26, 2017, issued in U.S. Appl. No. 14/923,520 (10 pages).

Taiwan Office action issued Aug. 9, 2017, corresponding to Taiwan Application No. 105120402 (9 pages).

Chinese Office Action issued Dec. 18, 2017 in corresponding Chinese Patent Application No. 201510729509.4 (9 pages).

(56) References Cited

OTHER PUBLICATIONS

European Search Report for corresponding European Application No. 15854252.2, European Search Report mailed May 14, 2018 (14 pgs.).
U.S. Office Action dated Mar. 5, 2018, issued in U.S. Appl. No. 14/976,408 (18 pages).
U.S. Office Action dated May 16, 2018, issued in U.S. Appl. No. 14/923,520 (7 pages).
U.S. Office Action dated Oct. 17, 2018, issued in U.S. Appl. No. 15/491,699 (10 pages).
Chinese Office action dated Nov. 2, 2018, corresponding to Chinese Patent Application No. 201610491631 .7 (11 pages).
U.S. Final Office Action dated Jan. 17, 2019, issued in U.S. Appl. No. 15 /198,977 (13 pages).
Korean Office Action dated Jan. 28, 2019, corresponding to Korean Patent Application No. 10-2016-0170837 (5 pages).
U.S. Office Action dated Mar. 22, 2019, issued in U.S. Appl. No. 15/522,253 (22 pages).
Chinese Office Action dated Jul. 2, 2019, corresponding to Chinese Application No. 2015-80058757.9, (9 pages).
Chinese Office Action dated Oct. 12, 2019, corresponding to Chinese Application No. 2017-10269050.3, (17 pages).
Machine translation of WO 2014 091927 A1 (Year: 2014).
Advisory Action for U.S. Appl. No. 14/929,160 dated Aug. 30, 2019, 3 pages.
Advisory Action for U.S. Appl. No. 14/929,160 dated Dec. 17, 2018, 3 pages.
Advisory Action for U.S. Appl. No. 14/929,160 dated Sep. 14, 2018, 3 pages.
Advisory Action for U.S. Appl. No. 15/084,361 dated Jul. 14, 2020, 6 pages.
Advisory Action for U.S. Appl. No. 15/084,361 dated Jun. 28, 2018, 8 pages.
Advisory Action for U.S. Appl. No. 15/198,977 dated Jan. 17, 2018, 5 pages.
Advisory Action for U.S. Appl. No. 15/198,977 dated Mar. 29, 2019, 3 pages.
Advisory Action for U.S. Appl. No. 15/491,699 dated May 3, 2019, 3 pages.
Advisory Action for U.S. Appl. No. 16/942,678 dated Jun. 17, 2022, 4 pages.
Advisory Action for U.S. Appl. No. 17/068,155 dated Mar. 7, 2022, 4 pages.
Advisory Action for U.S. Appl. No. 16/933,853 dated Jul. 21, 2022, 6 pages.
China Office Action in CN Application No. 201610191474.8 mailed Jun. 4, 2018, 9 pgs.
Final Office Action for U.S. Appl. No. 14/929,160 dated Oct. 4, 2018, 11 pages.
Final Office Action for U.S. Appl. No. 14/929,160 dated Jul. 6, 2018, 8 pages.
Final Office Action for U.S. Appl. No. 14/929,160 dated Jun. 18, 2019, 10 pages.
Final Office Action for U.S. Appl. No. 14/976,408 dated Aug. 27, 2018, 14 pages.
Final Office Action for U.S. Appl. No. 15/084,361 dated Apr. 16, 2018, 23 pages.
Final Office Action for U.S. Appl. No. 15/084,361 dated Apr. 29, 2020, 23 pages.
Final Office Action for U.S. Appl. No. 15/084,361 dated Mar. 21, 2019, 21 pages.
Final Office Action for U.S. Appl. No. 15/198,977 dated Apr. 22, 2020, 10 pages.
Final Office Action for U.S. Appl. No. 15/198,977 dated Sep. 28, 2017, 10 pages.
Final Office Action for U.S. Appl. No. 15/491,699 dated Feb. 26, 2019, 8 pages.
Final Office Action for U.S. Appl. No. 15/491,699 dated Nov. 21, 2019, 9 pages.
Final Office Action for U.S. Appl. No. 16/933,853 dated Apr. 12, 2022, 30 pages. .
Final Office Action for U.S. Appl. No. 16/942,678 dated Mar. 28, 2022, 14 pages.
KIPO Office Action (Translation) dated Oct. 14, 2015 for Korean Patent Application No. 10-2015-0024448, 3-pages.
KIPO Office Action dated Dec. 13, 2016 for Korean Patent Application No. 10-2015-0045770, 7 pgs.
KIPO Office Action dated Oct. 14, 2015, for corresponding Korean Patent Application No. 10-2015-0024448, 4-pages.
Notice of Allowance for U.S. Appl. No. 14/929,160 dated Apr. 14, 2020, 8 pages.
Notice of Allowance for U.S. Appl. No. 15/198,977 dated Jul. 9, 2020, 8 pages.
Notice of Allowance for U.S. Appl. No. 15/491,699 dated Feb. 5, 2020, 8 pages.
Notice of Allowance for U.S. Appl. No. 15/522,253 dated Jan. 30, 2020, 7 pages.
Notice of Allowance for U.S. Appl. No. 15/522,253 dated Oct. 18, 2019, 10 pages.
Notice of Allowance for U.S. Appl. No. 17/068,155 dated Jul. 28, 2022, 8 pages.
Office Action for U.S. Appl. No. 14/929,160 dated Jan. 31, 2019, 9 pages.
Office Action for U.S. Appl. No. 14/929,160 dated Nov. 24, 2017, 9 pages.
Office Action for U.S. Appl. No. 14/929,160 dated Nov. 15, 2019, 12 pages.
Office Action for U.S. Appl. No. 14/973,312 dated May 19, 2017, 19 pages.
Office Action for U.S. Appl. No. 15/084,361 dated May 17, 2017, 17 pages.
Office Action for U.S. Appl. No. 15/084,361 dated Nov. 27, 2018, 21 pages.
Office Action for U.S. Appl. No. 15/084,361 dated Sep. 27, 2017, 18 pages.
Office Action for U.S. Appl. No. 15/084,361 dated Sep. 20, 2019, 22 pages.
Office Action for U.S. Appl. No. 15/198,977 dated Jun. 27, 2018, 12 pages.
Office Action for U.S. Appl. No. 15/198,977 dated May 3, 2017, 11 pages.
Office Action for U.S. Appl. No. 15/198,977 dated Sep. 17, 2019, 13 pages.
Office Action for U.S. Appl. No. 15/491,699 dated Aug. 7, 2019, 7 pages.
Office Action for U.S. Appl. No. 16/933,853 dated Jun. 23, 2021, 23 pages.
Office Action for U.S. Appl. No. 17/682,749 dated Jul. 21, 2022, 44 pages.
Restriction Requirement for U.S. Appl. No. 14/929,160 dated Aug. 29, 2017, 5 pages.
Restriction Requirement for U.S. Appl. No. 14/929,160 dated Apr. 24, 2018, 5 pages.
Restriction Requirement for U.S. Appl. No. 15/198,977 dated Dec. 29, 2016, 6 pages.
Restriction Requirement for U.S. Appl. No. 15/491,699 dated Aug. 1, 2018, 8 pages.
Dube, Marc A. et al., "The Effect of Polymer Microstructure and Thermal Post-Treatment on Latex-Based Pressure Sensitive Adhesive Performance," Macromol. Symp., vol. 324, 2013, pp. 49-54.
Rui, Qi et al., "Progress in pressure sensitive adhesives for the optical filters of the flat-panel displays," Modern Chemical Industry, Dec. 2012, pp. 32-36.
Chinese Office Action dated Dec. 9, 2022, issued in corresponding Chinese Patent Application No. 202111327740.2 (12 pages).
US Office Action dated Feb. 9, 2023, issued in U.S. Appl. No. 16/942,678 (10 pages).
US Final Office Action dated Feb. 27, 2023, issued in U.S. Appl. No. 17/682,749 (48 pages).
US Notice of Allowance dated Mar. 13, 2023, issued in U.S. Appl. No. 17/068,155 (8 pages).
Nagase America, Version 2.0, 2010 (Year: 2010).

(56) References Cited

OTHER PUBLICATIONS

US Office Action dated May 25, 2023, issued in U.S. Appl. No. 16/942,678 (10 pages).
Aldrich, "Reference: Polymer Properties", pp. 52-53. date accessed: Sep. 1, 2023 <https://www3.nd.edu/-hgao/thermal_transitions_of_homopolymers.pdf> (Year: 2023).
US Final Office Action dated Sep. 7, 2023, issued in U.S. Appl. No. 16/942,678 (10 pages).
US Final Office Action dated Mar. 20, 2024, issued in U.S. Appl. No. 17/682,749 (39 pages).
US Final Office Action dated Feb. 20, 2025, issued in U.S. Appl. No. 17/682,749 (41 pages).
US Office Action dated Sep. 6, 2024, issued in U.S. Appl. No. 17/682,749 (40 pages).
US Office Action dated Apr. 21, 2025, issued in U.S. Appl. No. 18/407,294 (7 pages).
US Final Office Action dated Sep. 16, 2025, issued in U.S. Appl. No. 18/407,294 (8 pages).
US Office Action dated Oct. 29, 2025, issued in U.S. Appl. No. 17/682,749 (40 pages).
US Office Action dated May 12, 2026, issued in U.S. Appl. No. 18/407,294 (6 pages).
US Office Action dated May 18, 2026, issued in U.S. Appl. No. 18/732,366 (10 pages).

* cited by examiner (a)

(b)

ADHESIVE COMPOSITION, ADHESIVE FILM PREPARED FROM THE SAME AND DISPLAY MEMBER INCLUDING THE SAME

CROSS-REFERENCE TO RELATED APPLICATIONS

This application is a continuation of, and claims priority to and the benefit of U.S. patent application Ser. No. 16/933,853, filed Jul. 20, 2020, which is a continuation of U.S. patent application Ser. No. 14/929,160, filed Oct. 30, 2015, now U.S. Pat. No. 10,745,597, issued Aug. 18, 2020, which claims priority to and the benefit of Korean Patent Application Nos. 10-2014-0150799 filed on Nov. 1, 2014, 10-2014-0151571 filed on Nov. 3, 2014, 10-2014-0156462 filed on Nov. 11, 2014, and 10-2015-0024448 filed on Feb. 17, 2015 in the Korean Intellectual Property Office, the entire contents of all of which are incorporated herein by reference.

BACKGROUND

1. Technical Field

Embodiments of the present invention relate to an adhesive composition, an adhesive film formed from the same, and a display member including the same.

2. Description of the Related Art

Transparent adhesive films are used as adhesive films for the interlayer bonding of stacked parts in an optical display, or for attaching the touchscreen of a mobile phone.

In particular, in an optical display, a capacitive touch pad is attached to a window or film via an adhesive film, and the capacitive touch pad senses changes in capacitance of the window or film. The adhesive film attaching the touch pad is stacked between the window glass and a TSP sensor glass.

Transparent adhesive films improve the clarity of the screen (as compared to existing double-sided tapes) and exhibit good adhesion while also acting like glass by transmitting 97% or more of light. The transparent adhesive film can be used in tablet PCs, TVs and the like, including mid- or large-sized display screens as well as mobile phones.

Recently, due to the increasing severity of the environments in optical displays are used, stored and/or manufactured and to increasing interest in flexible optical displays and the like, a variety of properties are becoming necessary for the transparent adhesive film. In particular, for application in flexible displays, there is a need for a transparent adhesive film that maintains viscoelasticity over a wide temperature range and also exhibits good recoverability.

SUMMARY

In some embodiments of the present invention, an adhesive composition exhibits reliability under severe conditions, recoverability, transparency and adhesion while maintaining viscoelasticity over a wide temperature range. In some embodiments, an adhesive film is formed from the adhesive composition. In some embodiments, a display member includes the adhesive film.

In accordance with embodiments of the present invention, an adhesive film has an average slope of about −9.9 to about 0 (as measured at about −20° C. to about 80° C.) in a graph of the temperature-dependent storage modulus distribution of the adhesive film. In the graph, the x-axis represents temperature (° C.) and the y-axis represents the storage modulus (in kPa). The adhesive film has a storage modulus at about 80° C. of about 10 kPa to about 1,000 kPa.

The adhesive film may have a T-peel strength of about 200 gf/in to about 3,000 gf/in, as measured at 25° C. with respect to a non-corona-treated polyethylene terephthalate (PET) film.

The adhesive film may have a T-peel strength of about 100 gf/in to about 2,000 gf/in, as measured at 60° C. with respect to a non-corona-treated polyethylene terephthalate (PET) film.

The adhesive film may have a T-peel strength of about 400 gf/in to about 4,000 gf/in, as measured at 25° C. with respect to a corona-treated polyethylene terephthalate (PET) film.

The adhesive film may have a T-peel strength of about 200 gf/in to about 2,000 gf/in, as measured at 60° C. with respect to a corona-treated polyethylene terephthalate (PET) film.

In some embodiments, the adhesive film may be formed from an adhesive composition that includes a monomer mixture forming the hydroxyl group-containing (meth) acrylic copolymer and organic particles.

The organic particles may have an average particle diameter of about 10 nm to about 400 nm.

The monomer mixture forming the hydroxyl group-containing (meth)acrylic copolymer may include a hydroxyl group-containing (meth)acrylate monomer and a comonomer.

In some embodiments, the hydroxyl group-containing (meth)acrylic copolymer may be a polymer from a monomer mixture including a hydroxyl group-containing (meth)acrylate monomer, and a comonomer.

In some embodiments, the organic particles may have a core-shell structure, and the core and the shell may satisfy Equation 2.

$$Tg(c)<Tg(s) \qquad \text{Equation 2}$$

In Equation 2, Tg(c) is the glass transition temperature (° C.) of the core, and Tg(s) is the glass transition temperature (° C.) of the shell.

The core may have a glass transition temperature (Tg(c)) of about −150° C. to about 10° C., and the shell may have a glass transition temperature (Tg(s)) of about 15° C. to about 150° C.

In some embodiments, the core may include at least one polyalkyl (meth)acrylate having a glass transition temperature of about −150° C. to about 10° C., and the shell may include at least one polyalkyl (meth)acrylate having a glass transition temperature of about 15° C. to about 150° C.

In some embodiments, the shell may include two or more layers, and an outermost layer of the organic particles may include at least one polyalkyl (meth)acrylate having a glass transition temperature of about 15° C. to about 150° C.

The shell may be present in an amount of about 1% by weight (wt %) to about 70 wt % in the organic particles.

In some embodiments, the organic particles may be present in an amount of about 0.1 parts by weight to about 15 parts by weight based on 100 parts by weight of the monomer mixture forming the hydroxyl group-containing (meth)acrylic copolymer.

A difference in the index of refraction between the organic particles and the hydroxyl group-containing (meth)acrylic copolymer formed from monomer mixture may be about 0.5 or less, for example, about 0.05 or less.

In some embodiments, the monomer mixture forming the hydroxyl group-containing (meth)acrylic copolymer may include about 5 wt % to about 40 wt % of the hydroxyl group-containing (meth)acrylate monomer, and about 60 wt % to about 95 wt % of the comonomer.

The comonomer may include at least one of an alkyl (meth)acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, and/or a silane group-containing monomer. The comonomer may have a glass transition temperature (Tg) of about −150° C. to about 0° C.

In some embodiments, the monomer mixture may further include a carboxyl group-containing monomer.

In some embodiments, the adhesive composition may further include at least one of an initiator and/or a cross-linking agent.

In some embodiments, the adhesive composition may further include a silane coupling agent.

In some embodiments, the adhesive composition may further include at least one of a molecular weight regulator, an antioxidant, an anti-aging agent, a stabilizer, and/or an adhesion-imparting resin.

The adhesive film having a thickness of about 100 μm may have a haze of about 5% or lower, which may be as measured after the adhesive film is subjected to about 200% stretching.

The adhesive film has a recovery rate of about 30% to about 98%, as calculated using Equation 3.

$$\text{Recovery rate }(\%)=(1-(X_f/X_0))\times 100 \quad \text{Equation 3}$$

In Equation 3, $X_0$ is the initial length of the film, and $X_f$ is the length of the film after stretching, as determined according to the following procedure. Both of the ends of a polyethylene terephthalate (PET) film (thickness: about 75 μm) having a size of about 50 mm×about 20 mm (length×width) are defined as the first end and the second end. A specimen is prepared by bonding the ends of two PET films to each other via an adhesive film having a size of 20 mm×20 mm (length×width). In particular, the bonding results in a first end of a first PET film/adhesive film (length×width: about 20 mm×about 20 mm)/second end of second PET film structure. Next, jigs are secured to the non-bonded ends of the first and second PET films of the specimen. The jig at one end is kept fixed while the jig at the other end is pulled to a length of 1,000% of the thickness (unit: μm) of the adhesive film (i.e., to 10 times the initial thickness ($X_0$) of the adhesive film) at a rate of about 300 mm/min, and then maintained in that position for 10 seconds. Then, the adhesive film is recovered at the same rate (about 300 mm/min) as the pulling rate, followed by the application of a force of 0 kPa to the adhesive film. The increased length of the adhesive film is defined as $X_f$ (unit: μm)).

The adhesive film may have a bubble generation area of about 0%, as measured when the adhesive film (having length×width×thickness dimensions of 13 cm×3 cm×100 μm and including a 50 μm thick PET film stacked on one surface thereof and a 100 μm thick PET film stacked on the other surface thereof) is folded in half towards the 50 μm thick PET film (such that the adhesive film has half the length), followed by placing the adhesive film between parallel frames having a gap of about 1 cm, and then aging the film at 70° C. and 93% RH for 24 hours.

The adhesive film may have a thickness of about 1 μm to about 2 mm.

The adhesive film may be an adhesive film cured by UV irradiation.

In accordance with embodiments of the present invention, a display member may include an optical film, and an adhesive film attached to one or both surfaces of the optical film.

In some embodiments, the optical film may be selected from touch panels, windows, polarizing plates, color filters, retardation films, elliptical polarizing films, reflective films, anti-reflective films, compensation films, brightness improving films, alignment films, optical diffusion films, glass shatter-proof films, surface protective films, OLED device barrier layers, plastic LCD substrates, indium tin oxide (ITO), fluorinated tin oxide (FTO), aluminum-doped zinc oxide (AZO), carbon nanotube (CNT)-containing films, Ag nanowire-containing films, and/or graphene.

BRIEF DESCRIPTION OF DRAWINGS

FIG. 2(*b*) is a conceptual diagram of a specimen for measuring T-peel strength and depicting the process for determining T-peel strength.

FIG. 3(*b*) is a plan view of a specimen for used to measure recovery rate.

DETAILED DESCRIPTION

As used herein, the term "(meth)acrylate" may refer to acrylates and/or methacrylates.

As used herein, the term "copolymer" may include oligomers, polymers, and resins.

As used herein, the term "comonomer" refers to a monomer polymerized with a hydroxyl group-containing (meth) acrylate, and may be any monomer without limitation so long as the monomer can be polymerized with a hydroxyl group-containing (meth)acrylate.

As used herein, the term "glass transition temperature of comonomer or monomer" may be determined, for example, on a homopolymer of each monomer to be measured using a DSC Q20 from TA Instruments. Specifically, the glass transition temperature may be determined on the homopolymer of each monomer by increasing the temperature to 160° C. at a rate of 20° C./min and allowing it cool slowly, thereby maintaining the equilibrium state at 50° C. to obtain the data of an endothermic transition curve at time which the temperature increases to 160° C. at a rate of 10° C./min. The point of inflection of the endothermic transition curve may be taken as the glass transition temperature.

As used herein, the term "average slope" refers to the average slope over a temperature range of about −20° C. to about 80° C. in a graph depicting a temperature-dependent storage modulus distribution of the adhesive film where the x-axis represents temperature (° C.) and the y-axis represents the storage modulus (kPa). The average slope is calculated by Equation 1.

$$\text{Average slope}=(Mo(80°\text{ C.})-Mo(-20°\text{ C.}))/(80-(-20)) \quad \text{Equation 1}$$

In Equation 1, Mo(80° C.) is the storage modulus at 80° C., and Mo(−20° C.) is the storage modulus at −20° C.

Figure 2A:
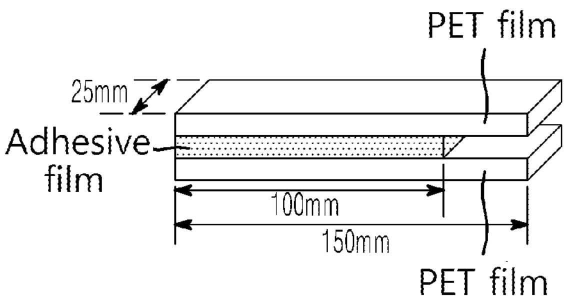
FIG. 2(*a*) is a conceptual diagram of a specimen for measuring T-peel strength.
Figure 2B:
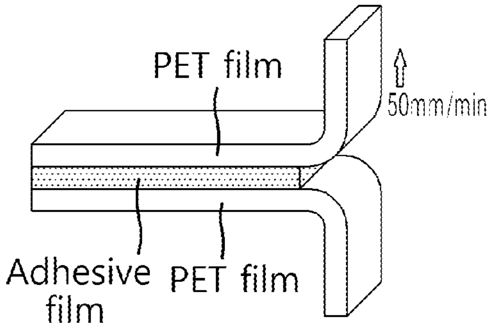

As used herein, the term "T-peel strength with respect to a corona-treated polyethylene terephthalate (PET) film" refers to a value measured by the following procedures i) to v).

i) An adhesive composition is coated onto a polyethylene terephthalate (PET) release film, followed by UV irradiation at a dose of 2000 mJ/cm$^2$, thereby manufacturing an adhesive sheet (having a thickness of about 100 μm thick) of an adhesive film and the PET film.

ii) A PET film having a size of about 150 mm×about 25 mm×about 75 μm (length×width×thickness) is subjected to corona treatment twice (total dose: 156) under corona discharge at a dose of 78 using a corona treatment device.

iii) An adhesive film sample having a size of about 100 mm×about 25 mm×about 100 μm (length×width×thickness) is obtained from the adhesive sheet, followed by laminating the corona-treated surfaces of the PET films to both surfaces of the adhesive film sample, thereby preparing a specimen, as shown in FIG. 2(*a*).

iv) The specimen is autoclaved at 3.5 bar and 50° C. for 1,000 seconds and secured to a TA.XT_Plus texture analyzer (Stable Micro Systems Co., Ltd.).

v) In the TA.XT_Plus texture analyzer, the PET film is kept fixed at one side and pulled at the other side at a rate of 50 mm/min, thereby measuring T-peel strength (see FIG. 2(*b*)).

As used herein, the term "T-peel strength with respect to a non-corona-treated polyethylene terephthalate (PET) film (hereinafter referred to as a non-corona PET)" refers to a value measured in the same manner as discussed above in connection with the measurement of T-peel strength with respect to the corona-treated polyethylene terephthalate (PET) film except that the procedure ii) of performing corona treatment of the PET film is omitted.

Figure 3A:
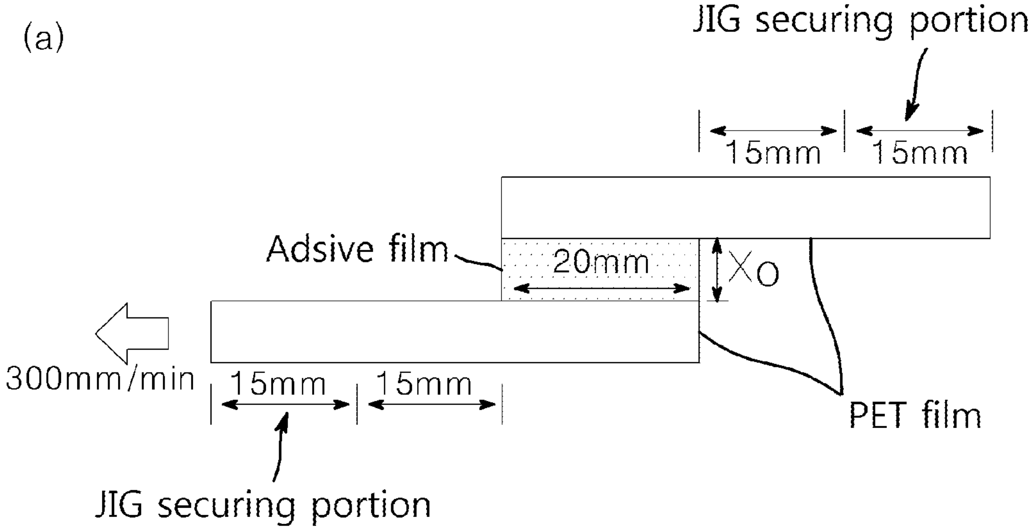
FIG. 3(*a*) is a schematic cross-sectional view of a specimen used to measure recovery rate.
Figure 3B:
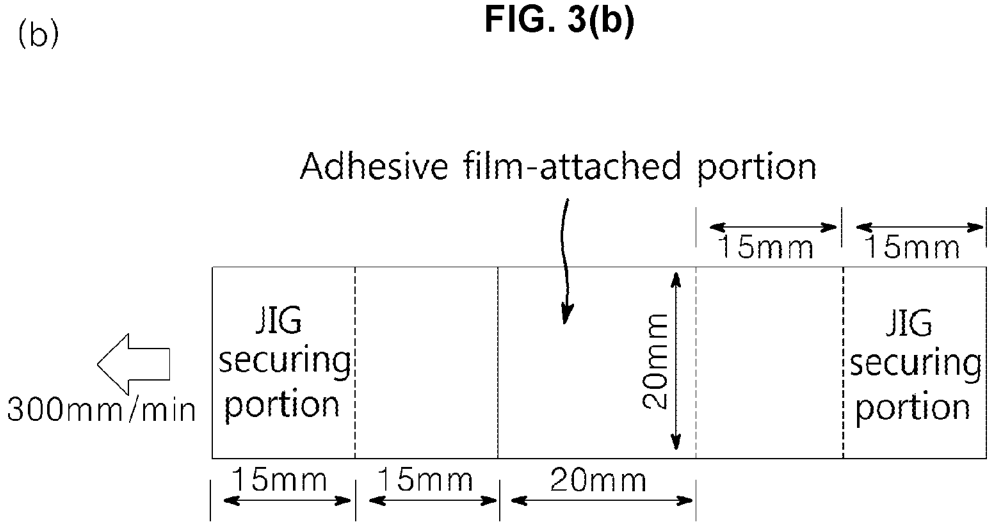

Herein, the "recovery rate" can be measured through the following procedures. The two ends of a polyethylene terephthalate (PET) film (thickness: about 75 μm) having a size of about 50 mm×about 20 mm (length×width) are defined as a first end and a second end. A specimen is prepared by bonding the ends of two PET films to each other via an adhesive film having a size of about 20 mm×about 20 mm (length×width) to yield a first end of a first PET film/adhesive film/second end of a second PET film structure. The specimen has a contact area of about 20 mm×about 20 mm (length×width) between each of the first and second PET films and the adhesive film (see FIGS. 3(*a*) and 3 (*b*)). Referring to FIG. 3(*a*), jigs are secured to the non-bonded ends of the PET films of the specimen at room temperature (25° C.). Next, the jig at one side of the specimen is kept fixed, while the jig at the other side is pulled to a length of 1,000% of thickness (unit: μm) of the adhesive film (to a length of 10 times an initial thickness ($X_0$) of the adhesive film) at a rate of about 300 mm/min, and then maintained in that position for 10 seconds. Next, a force of 0 kPa is applied to the adhesive film by recovering the adhesive film at the same rate (about 300 mm/min) as the pulling rate, the recovery rate (%) is calculated by Equation 3 (where $X_f$ (unit: μm) is the increased length of the adhesive film).

$$\text{Recovery rate (\%)} = (1-(X_f/X_0))\times 100 \qquad \text{Equation 3}$$

Here, the initial thickness of the adhesive film may range from about 20 μm to about 300 μm. The recovery rate may be measured using a TA.XT_Plus texture analyzer (Stable Micro Systems Co., Ltd.). The recovery rate may be measured at about 25° C. to about 80° C.

As used herein, the term "bubble generation area" refers to a value (%) measured through the following procedures. An adhesive film (length×width×thickness: about 13 cm×about 3 cm×about 100 μm) including a PET film (having a thickness of about 50 μm) stacked on one surface adhesive film, and a PET film (having a thickness of about 100 μm) stacked on the other surface of the adhesive film, is folded in half towards the 50 μm thick PET film such that the length of the adhesive film is cut in half. The adhesive film is then placed between parallel frames having a gap of about 1 cm. Next, the adhesive film is aged at 70° C. and 93% RH for 24 hours, followed by analyzing the image, which is obtained through observation of the portions of the adhesive film suffering from bubbles using an optical microscope (EX-51, Olympus Co., Ltd., magnification: 30×), and Mac-View software (Mountech Co., Ltd.) to measure the ratio of area occupied by bubbles to the total area of the adhesive film.

As used herein, the term "average particle diameter" refers to a z-average particle diameter of the organic particles (described herein), as measured in a water-based or organic solvent using a Zetasizer nano-ZS (Malvern Co., Ltd.).

As used herein, the term "core-shell structure" may refer to typical core-shell structures including structures having several layers of cores or shells, and the term "outermost layer" refers to the outermost layer of the several layers.

According to embodiments of the present invention, an adhesive film has an average slope of about −9.9 to about 0, as measured over the range of about −20° C. to about 80° C., in a graph depicting a temperature-dependent storage modulus distribution of the adhesive film. In the graph, the x-axis represents temperature (° C.) and the y-axis represents the storage modulus (kPa). The adhesive film has a storage modulus at about 80° C. of about 10 kPa to about 1,000 kPa.

In some embodiments, the adhesive film may have an average slope of about −9.9 to about 0, about −9 to about 0, about −8 to about 0, about −7 to about 0, about −6 to about 0, about −5 to about 0, about −4 to about 0, about −3 to about 0, about −2.9 to about 0, about −2.8 to about 0, about −2.7 to about 0, about −2.6 to about 0, about −2.5 to about 0, about −2.4 to about 0, about −2.3 to about 0, about −2.2 to about 0, about −2.1 to about 0, about −2.0 to about 0, about −1.9 to about 0, about −1.8 to about 0, about −1.7 to about 0, about −1.6 to about 0, about −1.5 to about 0, about −1.4 to about 0, about −1.3 to about 0, about −1.2 to about 0, about −1.1 to about 0, about −1.0 to about 0, about −0.9 to about 0, about −0.8 to about 0, about −0.7 to about 0, about −0.6 to about 0, or about −0.5 to about 0. In addition, the adhesive film may have an average slope ranging from any one of these numerical values to any other of these numerical values. For example, the adhesive film may have an average slope of about −5 to about 0, or about −2 to about 0. Within these ranges, the adhesive film can exhibit viscoelasticity over a wide temperature range, and a good recovery rate, and can be used as flexible optical members.

The average slope refers to the average slope over the range of about −20° C. to about 80° C. in a graph depicting a temperature-dependent storage modulus distribution of the adhesive film where the x-axis represents temperature (C) and the y-axis represents storage modulus (kPa). The average slope is calculated by Equation 1.

$$\text{Average slope} = (Mo(80°\text{ C.})-Mo(-20°\text{ C.}))/(80-(-20)) \qquad \text{Equation 1}$$

In Equation 1, Mo(80° C.) is the storage modulus at 80° C., and Mo(−20° C.) is the storage modulus at −20° C.

In addition, the adhesive film has a storage modulus at about 80° C. of about 10 kPa to about 1,000 kPa. For example, the adhesive film may have a storage modulus at about 80° C. of about 10 kPa to about 1,000 kPa, about 10 kPa to about 900 kPa, about 10 kPa to about 800 kPa, about 10 kPa to about 700 kPa, about 10 kPa to about 600 kPa, about 10 kPa to about 500 kPa, about 10 kPa to about 400 kPa, about 10 kPa to about 300 kPa, about 10 kPa to about 200 kPa, about 10 kPa to about 100 kPa, about 10 kPa to about 90 kPa, about 10 kPa to about 80 kPa, about 10 kPa to about 70 kPa, about 10 kPa to about 60 kPa, about 10 kPa to about 50 kPa, about 10 kPa to about 40 kPa, or about 10 kPa to about 30 kPa. Further, the adhesive film may have a storage modulus at about 80° C. ranging from any one of these numerical values to any other of these numerical values. Within these ranges, the adhesive film exhibits viscoelasticity even at high temperature as well as a good recovery rate. For example, the adhesive film may have a storage modulus at about 80° C. of about 10 kPa to about 500 kPa, or about 10 kPa to about 300 kPa.

The adhesive film may have a T-peel strength of about 200 gf/in, 300 gf/in, 400 gf/in, 500 gf/in, 600 gf/in, 700 gf/in, 800 gf/in, 900 gf/in, 1000 gf/in, 1100 gf/in, 1200 gf/in, 1300 gf/in, 1400 gf/in, 1500 gf/in, 1600 gf/in, 1700 gf/in, 1800 gf/in, 1900 gf/in, 2000 gf/in, 2100 gf/in, 2200 gf/in, 2300 gf/in, 2400 gf/in, 2500 gf/in, 2600 gf/in, 2700 gf/in, 2800 gf/in, 2900 gf/in, or 3000 gf/in, as measured at 25° C. with respect to a non-corona-treated polyethylene terephthalate (PET) film (hereinafter referred to as a non-corona PET film). In addition, the adhesive film may have a T-peel strength ranging from any one of these numerical values to any other of these numerical values as measured at room temperature (about 25° C.) with respect to a non-corona PET film. For example, the adhesive film may have a T-peel strength of about 200 gf/in to about 3,000 gf/in, about 300 gf/in to about 2,500 gf/in, or about 400 gf/in to about 2,000 gf/in, as measured at 25° C. with respect to a non-corona PET film. Within these ranges, the adhesive film exhibits reliability and good adhesion at room temperature.

The adhesive film may have a T-peel strength of about 100 gf/in, 200 gf/in, 300 gf/in, 400 gf/in, 500 gf/in, 600 gf/in, 700 gf/in, 800 gf/in, 900 gf/in, 1000 gf/in, 1100 gf/in, 1200 gf/in, 1300 gf/in, 1400 gf/in, 1500 gf/in, 1600 gf/in, 1700 gf/in, 1800 gf/in, 1900 gf/in, or 2000 gf/in, as measured at 60° C. with respect to a non-corona-treated polyethylene terephthalate (PET) film (hereinafter referred to as a non-corona PET film). In addition, the adhesive film may have a T-peel strength ranging from any one of these numerical values to any other of these numerical values, as measured at a high temperature (60° C.) with respect to a non-corona PET film. For example, the adhesive film may have a T-peel strength of about 100 gf/in to about 300 gf/in, about 100 gf/in to about 2,000 gf/in, about 200 gf/in to about 1,500 gf/in, or about 300 gf/in to about 1,000 gf/in, as measured at 60° C. with respect to a non-corona PET film. Within these ranges, the adhesive film exhibits reliability and good adhesion at high temperature.

To improve the peel strength of the adhesive film, a surface onto which the adhesive composition is coated may be subjected to a surface treatment in advance, for example, corona pretreatment at about 150 $mJ/cm^2$. For example, corona pretreatment may be performed by treating a surface of an adherend (for example, a PET film) twice under corona discharge at a dose of 78 using a corona treatment device (Now plasma Co., Ltd.). However, the pretreatment is not limited thereto.

The adhesive film may have a T-peel strength of about 400 gf/in, 500 gf/in, 600 gf/in, 700 gf/in, 800 gf/in, 900 gf/in, 1000 gf/in, 1100 gf/in, 1200 gf/in, 1300 gf/in, 1400 gf/in, 1500 gf/in, 1600 gf/in, 1700 gf/in, 1800 gf/in, 1900 gf/in, 2000 gf/in, 2100 gf/in, 2200 gf/in, 2300 gf/in, 2400 gf/in, 2500 gf/in, 2600 gf/in, 2700 gf/in, 2800 gf/in, 2900 gf/in, 3000 gf/in, 3100 gf/in, 3200 gf/in, 3300 gf/in, 3400 gf/in, 3500 gf/in, 3600 gf/in, 3700 gf/in, 3800 gf/in, 3900 gf/in, or 4000 gf/in, as measured at 25° C. with respect to a corona-treated polyethylene terephthalate (PET) film. In addition, the adhesive film may have a T-peel strength ranging from any one of these numerical values to any other of these numerical values, as measured at room temperature (25° C.) with respect to a corona-treated PET film. For example, the adhesive film may have a T-peel strength of about 400 gf/in to about 4,000 gf/in, about 600 gf/in to about 3,000 gf/in, or about 1,000 gf/in to about 2,000 gf/in, as measured at 25° C. with respect to a corona-treated PET film. Within these ranges, the adhesive film exhibits reliability and good adhesion at room temperature.

The adhesive film may have a T-peel strength of about 200 gf/in, 300 gf/in, 400 gf/in, 500 gf/in, 600 gf/in, 700 gf/in, 800 gf/in, 900 gf/in, 1000 gf/in, 1100 gf/in, 1200 gf/in, 1300 gf/in, 1400 gf/in, 1500 gf/in, 1600 gf/in, 1700 gf/in, 1800 gf/in, 1900 gf/in, or 2000 gf/in, as measured at 60° C. with respect to a corona-treated polyethylene terephthalate (PET) film. In addition, the adhesive film may have a T-peel strength ranging from any one of these numerical values to any other of these numerical values, as measured at a high temperature (60° C.) with respect to a corona-treated PET film. For example, the adhesive film may have a T-peel strength of about 200 gf/in to about 2,000 gf/in, about 300 gf/in to about 2,000 gf/in, about 400 gf/in to about 1,500 gf/in, or about 200 gf/in to about 300 gf/in, as measured at 60° C. with respect to a corona-treated PET film. Within these ranges, the adhesive film exhibits reliability and good adhesion at high temperatures.

A ratio of the T-peel strength of the adhesive film at 25° C. with respect to a corona-treated PET film to the T-peel strength of the adhesive film at 25° C. with respect to a non-corona PET film may range from 2.5:1 to 5:1. Within this range, the adhesive film can exhibit balance between adhesion and reliability.

In some embodiments, the adhesive film may be formed from an adhesive composition including a hydroxyl group-containing (meth)acrylic copolymer, and in some embodiments, the adhesive film may further include organic particles.

Adhesive Composition

Hydroxyl Group Containing (Meth)Acrylic Copolymer

The hydroxyl group-containing (meth)acrylic copolymer may be polymerized from a monomer mixture comprising a hydroxyl group-containing (meth)acrylate monomer and a comonomer.

The hydroxyl group-containing (meth)acrylate monomer may be a $C_1$ to $C_{20}$ alkyl group-containing (meth)acrylic acid ester having at least one hydroxyl group, a $C_5$ to $C_{20}$ cycloalkyl group-containing (meth)acrylic acid ester having at least one hydroxyl group, or a $C_6$ to $C_{20}$ aryl group-containing (meth)acrylic acid ester having at least one hydroxyl group.

For example, the hydroxyl group-containing (meth)acrylate monomer may include at least one of 2-hydroxyethyl (meth)acrylate, 4-hydroxybutyl (meth)acrylate, 2-hydroxypropyl (meth)acrylate, 2-hydroxybutyl (meth)acrylate, and 6-hydroxyhexyl (meth)acrylate, but the hydroxyl group-containing (meth)acrylate monomer is not limited thereto.

For example, the hydroxyl group-containing (meth)acrylate monomer may be a $C_1$ to $C_5$ alkyl group-containing (meth) acrylate monomer having a hydroxyl group, thereby imparting further improved adhesion to the adhesive composition.

The hydroxyl group-containing (meth)acrylate monomer may be present in an amount of about 5 wt % to about 40 wt %, for example, about 10 wt % to about 30 wt %, or about 10 wt % to about 20 w % based on the total amount of the monomer mixture. Within these ranges, the adhesive film exhibits reliability and good adhesion.

The comonomer may include at least one of an alkyl (meth)acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, and/or a silane group-containing monomer, but the comonomer is not limited thereto.

The alkyl (meth)acrylate monomer may include an unsubstituted $C_1$ to $C_{20}$ linear or branched alkyl (meth)acrylic ester. For example, the alkyl (meth)acrylate monomer may include at least one of methyl (meth)acrylate, ethyl (meth) acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, isooctyl (meth)acrylate, nonyl (meth)acrylate, decyl (meth)acrylate, lauryl (meth)acrylate, and/or isobornyl (meth)acrylate. For example, the alkyl (meth)acrylate monomer may be a $C_4$ to $C_8$ alkyl (meth)acrylic monomer, thereby imparting improved initial adhesion to the adhesive composition.

The ethylene oxide-containing monomer may include at least one ethylene oxide group (—$CH_2CH_2O$—)-containing (meth)acrylate monomer. For example, the ethylene oxide-containing monomer may include a polyethylene oxide alkyl ether (meth)acrylate such as polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth) acrylate, polyethylene oxide monopentyl ether (meth)acrylate, polyethylene oxide dimethyl ether (meth)acrylate, polyethylene oxide diethyl ether (meth)acrylate, polyethylene oxide monoisopropyl ether (meth)acrylate, polyethylene oxide monoisobutyl ether (meth)acrylate, and/or polyethylene oxide mono-tert-butyl ether (meth)acrylate, but the ethylene oxide containing monomer is not limited thereto.

The propylene oxide-containing monomer may be selected from polypropylene oxide alkyl ether (meth)acrylates such as polypropylene oxide monomethyl ether (meth) acrylate, polypropylene oxide monoethyl ether (meth)acrylate, polypropylene oxide monopropyl ether (meth)acrylate, polypropylene oxide monobutyl ether (meth)acrylate, polypropylene oxide monopentyl ether (meth)acrylate, polypropylene oxide dimethyl ether (meth)acrylate, polypropylene oxide diethyl ether (meth)acrylate, polypropylene oxide monoisopropyl ether (meth)acrylate, polypropylene oxide monoisobutyl ether (meth)acrylate, and/or polypropylene oxide mono-tert-butyl ether (meth)acrylate, but the propylene oxide-containing monomer is not limited thereto.

The amino group-containing monomer may be selected from amino group-containing (meth)acrylic monomers such as monomethylaminoethyl (meth)acrylate, monoethylaminoethyl (meth)acrylate, monomethylaminopropyl (meth) acrylate, monoethylaminopropyl (meth)acrylate, dimethylaminoethyl (meth)acrylate, diethylaminoethyl (meth) acrylate, N-tert-butylaminoethyl (meth)acrylate, and/or methacryloxyethyltrimethyl ammonium chloride (meth) acrylate, but the amino group-containing monomer is not limited thereto.

The amide group-containing monomer may be selected from amide group-containing (meth)acrylic monomers such as (meth)acrylamide, N-methyl acrylamide, N-methyl methacrylamide, N-methylol (meth)acrylamide, N-methoxymethyl (meth)acrylamide, N,N-methylene bis(meth)acrylamide, and/or 2-hydroxyethyl acrylamide, but the amide group-containing monomer is not limited thereto.

The alkoxy group-containing monomer may be selected from 2-methoxyethyl (meth)acrylate, 2-methoxypropyl (meth)acrylate, 2-ethoxypropyl (meth)acrylate, 2-butoxypropyl (meth)acrylate, 2-methoxypentyl (meth)acrylate, 2-ethoxypentyl (meth)acrylate, 2-butoxyhexyl (meth)acrylate, 3-methoxypentyl (meth)acrylate, 3-ethoxypentyl (meth)acrylate, and/or 3-butoxyhexyl (meth)acrylate, but the alkoxy group-containing monomer is not limited thereto.

The phosphoric acid group-containing monomer may be selected from phosphoric acid group-containing acrylic monomers such as 2-methacryloyloxyethyldiphenylphosphate (meth)acrylate, trimethacryloyloxyethylphosphate (meth)acrylate, and triacryloyloxyethylphosphate (meth) acrylate, but the phosphoric acid group-containing monomer is not limited thereto.

The sulfonic acid group-containing monomer may be selected from sulfonic acid group-containing acrylic monomers such as sodium sulfopropyl (meth)acrylate, sodium 2-sulfoethyl (meth)acrylate, and/or sodium 2-acrylamido-2-methylpropane sulfonate, but the sulfonic acid group-containing monomer is not limited thereto.

The phenyl group-containing monomer may be selected from phenyl group-containing acrylic vinyl monomers such as p-tert-butylphenyl (meth)acrylate and/or o-biphenyl (meth)acrylate, but the sulfonic acid group-containing monomer is not limited thereto.

The silane group-containing monomer may be selected from silane group-containing vinyl monomers such as 2-acetoacetoxyethyl (meth)acrylate, vinyltrimethoxysilane, vinyltriethoxysilane, vinyl tris(β-methoxyethyl)silane, vinyltriacetylsilane, and/or methacryloyloxypropyltrimethoxysilane, but the silane group-containing monomer is not limited thereto.

The comonomer may be present in an amount of about 60 wt % to about 95 wt %, for example, about 70 wt % to about 90 wt %, or about 80 wt % to about 90 wt % based on the total amount of the monomer mixture. Within these ranges, the adhesive film exhibits reliability and good adhesion.

In some embodiments, the comonomer may have a glass transition temperature (Tg) of about −150° C. to about 0° C. Here, the glass transition temperature may be measured, for example, from a homopolymer of each monomer measurement target using a DSC Q20 (TA Instrument Inc.). For example, a homopolymer of each monomer is heated to about 160° C. at a rate of 20° C./min, followed by slowly cooling the homopolymer to maintain an equilibrium state at about 50° C., and then heated to about 160° C. at a rate of 10° C./min, thereby obtaining an endothermic transition curve. The inflection point of the endothermic transition curve is determined as the glass transition temperature. The comonomer having a glass transition temperature (Tg) of about −150° C. to about 0° C. may be any comonomer without limitation so long as the comonomer has a glass transition temperature (Tg) of about −150° C. to about 0° C. For example, the comonomer may be a comonomer having a glass transition temperature (Tg) of about −150° C. to about −20° C., or a comonomer having a glass transition temperature (Tg) of about −150° C. to about −40° C.

In some embodiments, the comonomer may be selected from alkyl (meth)acrylate monomers, ethylene oxide-containing monomers, propylene oxide-containing monomers, amine group-containing monomers, amide group-containing monomers, alkoxy group-containing monomers, phosphoric acid group-containing monomers, sulfonic acid group-containing monomers, phenyl group-containing monomers, and/or silane group-containing monomers, that have a glass transition temperature (Tg) of about −150° C. to about 0° C.

For example, the comonomer may be selected from alkyl (meth)acrylate monomers including methyl acrylate, ethyl acrylate, isopropyl acrylate, n-butyl acrylate, iso-butyl acrylate, hexyl (meth)acrylate, heptyl (meth)acrylate, 2-ethylhexyl acrylate, dodecyl (meth)acrylate, and/or the like; alkylene oxide group-containing (meth)acrylate monomers including polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polypropylene oxide monomethyl ether (meth)acrylate, polypropylene oxide monoethyl ether (meth)acrylate, polypropylene oxide monopropyl ether (meth)acrylate, and/or the like; amino group-containing (meth)acrylate monomers including monomethylaminoethyl (meth)acrylate, monoethylaminoethyl (meth)acrylate, monomethylaminopropyl (meth)acrylate, monoethylaminopropyl (meth)acrylate, and/or the like; alkoxy group-containing (meth)acrylate monomers including 2-methoxyethyl (meth)acrylate, 2-methoxypropyl (meth)acrylate, 2-ethoxypropyl (meth)acrylate and/or the like; and/or silane group-containing (meth)acrylate monomers including 2-acetoacetoxyethyl (meth)acrylate, vinyltrimethoxysilane, vinyltriethoxysilane, and/or the like.

In some embodiments, the hydroxyl group-containing (meth)acrylic copolymer may be a polymer formed from a mixture including a monomer mixture, which includes the hydroxyl group-containing (meth)acrylate monomer and the comonomer having a glass transition temperature (Tg) of about −150° C. to about 0° C., and organic particles. The comonomer having a glass transition temperature (Tg) of about −150° C. to about 0° C. may be present in an amount of about 60 wt % to about 95 wt %, for example, about 70 wt % to about 90 wt % based on the total amount of the monomer mixture. Within these ranges, the adhesive film exhibits reliability and good adhesion. The hydroxyl group-containing (meth)acrylate monomer may be present in an amount of about 5 wt % to about 40 wt %, for example, about 10 wt % to about 30 wt % based on the total amount of the monomer mixture. Within these ranges, the adhesive film has low haze and good adhesion.

In some embodiments, the monomer mixture may further include a carboxyl group-containing monomer.

The carboxyl group-containing monomer may include (meth)acrylic acid, 2-carboxyethyl (meth)acrylate, 3-carboxypropyl (meth)acrylate, 4-carboxybutyl (meth)acrylate, itaconic acid, crotonic acid, maleic acid, fumaric acid, and/or maleic anhydride, but the carboxyl group-containing monomer is not limited thereto.

For example, the carboxyl group-containing monomer may be present in an amount of about 10 wt % or less, about 7 wt % or less, or about 5 wt % or less, based on the total amount of the monomer mixture. Within these ranges, the adhesive film exhibits reliability and good adhesion.

The comonomer having a glass transition temperature (Tg) of about −150° C. to about 0° C. may be present in an amount of about 60 wt % to about 95 wt %, for example, about 70 wt % to about 90 wt %, based on the total amount of the monomer mixture. Within these ranges, the adhesive film exhibits reliability and good adhesion.

Organic Particles

The adhesive composition or the adhesive film may further include organic particles, which impart low temperature and/or room temperature viscoelasticity and stable high temperature viscoelasticity due to a crosslinked structure. In some embodiments, the organic particles may form a chemical bond to a hydroxyl group-containing (meth)acrylic copolymer.

Although the adhesive composition or the adhesive film may include the organic particles, there is a difference in the index of refraction between the organic particles (which have an average particle size, as described below) and the hydroxyl group-containing (meth)acrylic copolymer, which imparts good transparency.

When included, the organic particles may have an average particle diameter of about 10 nm to about 400 nm, for about 10 nm to about 300 nm, more specifically about 10 nm to about 200 nm. Within these ranges, agglomeration of the organic particles can be prevented (or reduced) and the adhesive film exhibits good transparency.

The difference in the index of refraction between the organic particles and the hydroxyl group-containing (meth) acrylic copolymer may be about 0.5 or less, for example about 0 to about 0.03, or about 0 to about 0.02. Within these ranges, the adhesive film exhibits good transparency.

The organic particles have a core-shell structure, and the core and the shell may have glass transition temperatures satisfying Equation 2.

$$Tg(c)<Tg(s) \quad \text{Equation 2}$$

In Equation 2, Tg(c) is the glass transition temperature (° C.) of the core, and Tg(s) is the glass transition temperature (° C.) of the shell).

The core may have a glass transition temperature of about −150° C. to about 10° C., for example about −150° C. to about −5° C., or about −150° C. to about −20° C. Within these ranges, the adhesive film can realize the storage modulus required at low temperatures (about −20° C.), and exhibits good low temperature and/or room temperature viscoelasticity.

In some embodiments, the core may include at least one polyalkyl (meth)acrylate having the glass transition temperature set forth above. For example, the core may include at least one of polymethyl acrylate, polyethyl acrylate, polypropyl acrylate, polybutyl acrylate, polyisopropyl acrylate, polyhexyl acrylate, polyhexyl methacrylate, polyethylhexyl acrylate, and/or polyethylhexyl methacrylate, but the core is not limited thereto. In some embodiments, the core may include at least one of polybutyl acrylate and/or polyethylhexyl acrylate.

The shell may have a glass transition temperature of about 15° C. to about 150° C., for example about 35° C. to about 150° C., or about 50° C. to about 140° C. Within these ranges, the organic particles exhibit good dispersibility in the hydroxyl group-containing (meth)acrylic copolymer.

In some embodiments, the shell may include a polyalkyl (meth)acrylate having the glass transition temperature as set forth above. For example, the shell may include at least one of polymethylmethacrylate (PMMA), polyethyl methacrylate, polypropyl methacrylate, polybutyl methacrylate, polyisopropyl methacrylate, polyisobutyl methacrylate, and/or polycyclohexyl methacrylate, but the shell is not limited thereto. In some embodiments, the shell may include polymethylmethacrylate.

In some embodiments, the shell may include two or more layers, and the outermost layer of the shell of the organic particles may include at least one polyalkyl (meth)acrylate having a glass transition temperature of about 15° C. to about 150° C. Additionally, the core may include at least one polyalkyl (meth)acrylate having a glass transition temperature of about −150° C. to about 10° C., and may also include at least one polyalkyl (meth)acrylate without a limitation on the glass transition temperature so long as the glass transition temperature of the overall core is about −150° C. to about 10° C. However, the core is not limited thereto. In addition, the shell may include at least one polyalkyl (meth) acrylate having a glass transition temperature of about 15° C. to about 150° C., and may also include at least one polyalkyl (meth)acrylate without a limitation on the glass transition temperature so long as the glass transition temperature of the overall shell is about 15° C. to about 150° C. However, the shell is not limited thereto.

The shell may be present in an amount of about 1 wt % to about 70 wt %, for example about 5 wt % to about 60 wt %, or about 10 wt % to about 50 wt % in the organic particles. Within these ranges, the adhesive film maintains viscoelasticity over a wide temperature range and exhibits a good recovery rate.

In some embodiments, the organic particles that may be included in the adhesive composition may be used in a polymerized state in which the organic particles are polymerized with the monomer mixture in the preparation of the hydroxyl group-containing (meth)acrylic copolymer. In this case, the organic particles are included in the hydroxyl group-containing (meth)acrylic copolymer.

In some embodiments, the adhesive composition may include: the hydroxyl group-containing (meth)acrylic copolymer; and the organic particles. In this case, the organic particles may be included in the adhesive composition separately from the hydroxyl group-containing (meth) acrylic copolymer.

In some embodiments, the organic particles may be included in the adhesive composition in an amount of about 0.1 parts by weight to about 15 parts by weight, for example, about 0.5 parts by weight to about 15 parts by weight, about 0.5 parts by weight to about 10 parts by weight, or about 0.5 parts by weight to about 8 parts by weight, based on 100 parts by weight of the monomer mixture forming the hydroxyl group-containing (meth)acrylic copolymer. Within these ranges, the adhesive film exhibits reliability and good adhesion.

In some embodiments, the adhesive composition may include: the hydroxyl group-containing (meth)acrylic copolymer formed of the monomer mixture including about 5 wt % to about 40 wt %, for example, about 10 wt % to about 30 wt % of the hydroxyl group-containing (meth)acrylate monomer and about 60 wt % to about 95 wt %, for example, about 70 wt % to about 90 wt % of the comonomer (for example, the comonomer having a glass transition temperature (Tg) of about −150° C. to about 0° C.); and the organic particles. Within these ranges, the adhesive film exhibits reliability and good adhesion.

In some embodiments, the adhesive composition may include: the hydroxyl group-containing (meth)acrylic copolymer formed of the monomer mixture including about 5 wt % to about 40 wt %, for example, about 10 wt % to about 30 wt % of the hydroxyl group-containing (meth)acrylate monomer, about 60 wt % to about 95 wt %, for example, about 70 wt % to about 90 wt % of the comonomer (for example, the comonomer having a glass transition temperature (Tg) of about −150° C. to about 0° C.), and about 10 wt % or less, for example about 7 wt % or less, or about 5 wt % or less of the carboxyl group-containing monomer; and the organic particles. Within these ranges, the adhesive film exhibits reliability and good adhesion.

The hydroxyl group-containing (meth)acrylic copolymer may have a glass transition temperature of about −150° C. to about −13° C., for example about −100° C. to about −20° C. Within these ranges, the adhesive film exhibits good adhesion over a wide temperature range, and good reliability and foldability.

In some embodiments, the hydroxyl group-containing (meth)acrylic copolymer may be prepared by mixing the monomer mixture, the organic particles and a radical photopolymerization initiator, followed by performing solution polymerization, suspension polymerization, photopolymerization, bulk polymerization, dispersion polymerization or emulsion polymerization. Alternatively, the hydroxyl group-containing (meth)acrylic copolymer may be prepared by preparing a prepolymer through partial polymerization of the monomer mixture, followed by introduction of the organic particles into the prepolymer. Emulsion polymerization may be performed at about 25° C. to about 100° C. by adding a dispersant, a crosslinking agent, the monomer mixture, the organic particles, and an initiator. The hydroxyl group-containing (meth)acrylic copolymer may be prepared by completely polymerizing the monomer mixture and the organic particles, or by partially polymerizing the monomer mixture and the organic particles, followed by completing polymerization through the addition of an initiator and a crosslinking agent. Partial polymerization may be performed by polymerizing the monomer mixture and the organic particles to a viscosity of about 300 cPs to about 50,000 cPs at 25° C.

In some embodiments, the adhesive composition may further include at least one of a crosslinking agent and/or an initiator.

Crosslinking Agent

The crosslinking agent may be a polyfunctional (meth) acrylate. Examples of the polyfunctional (meth)acrylate may include: bifunctional acrylates such as 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, neopentylglycol-modified trimethylpropane di(meth)acrylate, adamantane di(meth)acrylate, 9,9-bis[4-(2-acryloyloxyethoxy) phenyl] fluorine and the like; trifunctional acrylates such as trimethylolpropane tri(meth)acrylate, dipentaerythritol tri (meth)acrylate, propionic acid-modified dipentaerythritol tri (meth)acrylate, pentaerythritol tri(meth)acrylate, propylene oxide-modified trimethylolpropane tri(meth)acrylate, trifunctional urethane (meth)acrylates, tris(meth)acryloxyethylisocyanurate and the like; tetrafunctional acrylates such as diglycerin tetra(meth)acrylate, pentaerythritol tetra(meth) acrylate and the like; pentafunctional acrylates such as dipentaerythritol penta(meth)acrylate and the like; hexafunctional acrylates such as dipentaerythritol hexa(meth) acrylate, caprolactone-modified dipentaerythritol hexa(meth)acrylate, and urethane (meth)acrylates (for example, reaction products of an isocyanate monomer and trimethylolpropane tri(meth)acrylate). However, the crosslinking agent is not limited thereto. A single one of these crosslinking agents may be used, or a combination of crosslinking agents may be used. For example, to provide good durability, the crosslinking agent may be a polyfunctional (meth) acrylate of a polyhydric alcohol containing 2 to 20 hydroxyl groups.

The crosslinking agent may be present in an amount of about 0.01 parts by weight to about 10 parts by weight, for example about 0.03 parts by weight to about 7 parts by weight, or about 0.1 parts by weight to about 5 parts by weight, based on 100 parts by weight of the monomer mixture forming the hydroxyl group-containing (meth) acrylic copolymer. Within these ranges, the adhesive film exhibits good adhesion and improved reliability.

Initiator

The initiator may be a photopolymerization initiator or a thermal polymerization initiator.

The initiator may be an initiator which is the same as or different from the initiator used in the preparation of the hydroxyl group-containing (meth)acrylic copolymer. In some embodiments, the initiator may be a thermal polymerization initiator.

The photopolymerization initiator may be any initiator so long as the initiator can realize a second crosslinking structure by driving polymerization of the radical polymerizable compound during curing through light irradiation. For example, the photopolymerization initiator may include benzoin, hydroxyl ketone, amino ketone, phosphine oxide photoinitiators, and/or the like. For example, the photopolymerization initiator may include benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl-2-(hydroxy-2-propyl)ketone, benzophenone, p-phenylbenzophenone, 4,4'-bis(diethyl)aminobenzophenone, dichlorobenzophenone, 2-methylanthraquinone, 2-ethylanthraquinone, 2-t-butylanthraquinone, 2-am inoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic acid ester, oligo[2-hydroxy-2-methyl-1-[4-(1-methylvinyl)phenyl]propanone], and/or 2,4,6-trimethylbenzoyl-diphenyl-phosphine oxide. However, the initiator is not limited thereto. A single photopolymerization initiator may be used, or a combination of photopolymerization initiators may be used.

The thermal polymerization initiator may be any initiator without limitation so long as the initiator can realize a second crosslinking structure. Examples of suitable thermal polymerization initiators may include azo, peroxide and redox compounds. Examples of the azo compounds may include 2,2-azobis(2-methylbutyronitrile), 2,2-azobis(isobutyronitrile), 2,2-azobis(2,4-dimethylvaleronitrile), 2,2-azobis-2-hydroxymethylpropionitrile, dimethyl-2,2-methylazobis(2-methylpropionate), and/or 2,2-azobis(4-methoxy-2,4-dimethylvaleronitrile), but the azo compounds are not limited thereto. Examples of the peroxide compounds may include: inorganic peroxides such as potassium perchlorate, ammonium persulfate and/or hydrogen peroxide; and/or organic peroxides such as diacyl peroxide, peroxydicarbonate, peroxyester, tetramethylbutyl peroxyneodecanoate, bis (4-butylcyclohexyl) peroxydicarbonate, di(2-ethylhexyl) peroxycarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, t-butyl peroxy neoheptanoate, amyl peroxypivalate, t-butyl peroxypivalate, t-amyl peroxy-2-ethylhexanoate, lauroyl peroxide, dilauroyl peroxide, di(dodecanoyl) peroxide, benzoyl peroxide, and/or dibenzoyl peroxide, but the peroxide compounds are not limited thereto. Examples of the redox compounds may include mixtures of a peroxide compound and a reductant, but the redox compounds are not limited thereto. A single one of these azo, peroxide and redox compounds may be used, or a combination of compounds may be used.

The initiator may be present in an amount of about 0.01 parts by weight to about 5 parts by weight, for example about 0.05 parts by weight to about 3 parts by weight, or about 0.1 parts by weight to about 1 part by weight, based on 100 parts by weight of the monomer mixture forming the hydroxyl group-containing (meth)acrylic copolymer. Within these ranges, curing can be completely performed, deteriorations in transmittance of the adhesive composition due to the residual initiator can be prevented (or reduced), bubble generation in the adhesive composition can be reduced, and the adhesive composition can have good reactivity.

In some embodiments, the adhesive composition may further include a silane coupling agent.

Silane Coupling Agent

The silane coupling agent may include siloxane and epoxy silane coupling agents, but is not limited thereto. The silane coupling agent may be present in an amount of about 0.01 parts by weight to about 0.1 parts by weight, for example about 0.05 parts by weight to about 0.1 parts by weight, based on 100 parts by weight of the monomer mixture forming the hydroxyl group-containing (meth) acrylic copolymer. Within these ranges, the adhesive film can have improved reliability.

Additives

The adhesive composition may further include any suitable additive(s), such as curing accelerators, ionic liquids, lithium salts, inorganic fillers, softeners, molecular weight regulators, antioxidants, anti-aging agents, stabilizers, adhesion-imparting resins, modified resins (polyol, phenol, acrylic, polyester, polyolefin, epoxy, epoxidized polybutadiene resins, and the like), leveling agents, defoamers, plasticizers, dyes, pigments (coloring pigments, extender pigments, and the like), treating agents, UV blocking agents, fluorescent whitening agents, dispersants, heat stabilizers, photostabilizers, UV absorbers, antistatic agents, coagulants, lubricants, solvents, and/or the like.

The adhesive composition may further include a noncurable compound. In some embodiments, the adhesive composition does not include a solvent and may have a viscosity at 25° C. of about 300 cPs to about 50,000 cPs. Since the adhesive composition does not include a solvent, the adhesive composition can have improved reliability due to reductions in bubble generation. Within this viscosity range, the adhesive composition can have good coatability and a uniform thickness.

Adhesive Film

The adhesive film may be formed of the adhesive composition set forth above. For example, a mixture including the hydroxyl group-containing (meth)acrylate monomer, the comonomer (for example, the comonomer having a glass transition temperature (Tg) of about −150° C. to about 0° C.) and optionally, the organic particles is polymerized, thereby preparing the hydroxyl group-containing (meth)acrylic copolymer. Alternatively, a prepolymer may be prepared by partial polymerization of a monomer mixture, followed by introduction of the organic particles (when used) into the prepolymer, thereby preparing the hydroxyl group-containing (meth)acrylic copolymer. The adhesive composition may be prepared by mixing an initiator and a crosslinking agent with the prepared hydroxyl group-containing (meth) acrylic copolymer, followed by UV curing of the adhesive composition, thereby manufacturing the adhesive film.

In some embodiments, the adhesive composition (which may be prepared by mixing and polymerizing the monomer mixture forming the hydroxyl group-containing (meth) acrylic copolymer, the organic particles and a photopolymerization initiator, followed by adding an additional photopolymerization initiator to the polymer) is coated onto a release film, followed by curing, thereby manufacturing the adhesive film. The curing may be performed by irradiation at a wavelength of about 300 nm to about 400 nm at a dose of about 400 mJ/cm$^2$ to about 1500 mJ/cm$^2$ under oxygen-free conditions using a low-pressure lamp. A coating thickness of the adhesive composition may be about 10 μm to about 2 mm, for example about 20 μm to about 1.5 mm, but the coating thickness is not limited thereto.

The adhesive film may be used as an optically clear adhesive (OCA) film, or may be formed on an optical film and thus used as an adhesive optical film. Examples of the optical film may include polarizing plates. The polarizing plates include a polarizer and a protective film formed on the polarizer, and may further include a hard coating layer, an anti-reflective layer and/or the like.

In one embodiment, the adhesive film may have a storage modulus at 80° C. of about 10 kPa to about 1,000 kPa. Within this range, the adhesive film exhibits viscoelasticity even at high temperature as well as a good recovery rate, is not detached from an adherend even when frequently folded at high temperature, and overflow of the adhesive film can be prevented (or reduced).

The adhesive film may have a storage modulus at 25° C. of about 10 kPa, 20 kPa, 30 kPa, 40 kPa, 50 kPa, 60 kPa, 70 kPa, 80 kPa, 90 kPa, 100 kPa, 150 kPa, 200 kPa, 300 kPa, 400 kPa, 500 kPa, 600 kPa, 700 kPa, 800 kPa, 900 kPa, or 1,000 kPa. In addition, the adhesive film may have a storage modulus at 25° C. ranging from any one of these numerical values to any other one of these numerical values set. For example, the adhesive film may have a storage modulus at 25° C. of about 10 kPa to about 1,000 kPa, about 10 kPa to about 500 kPa, about 15 kPa to about 300 kPa, about 10 kPa to about 90 kPa, or about 20 kPa to about 60 kPa. Within these ranges, the adhesive film does not suffer from (or suffers from a reduced amount of) whitening due to flexibility when used in a flexible device at low temperature, the adhesive film can therefore be used for optical materials.

The adhesive film may have a storage modulus at −20° C. of about 10 kPa, 20 kPa, 30 kPa, 40 kPa, 50 kPa, 60 kPa, 70 kPa, 80 kPa, 90 kPa, 100 kPa, 150 kPa, 200 kPa, 300 kPa, 400 kPa, 500 kPa, 600 kPa, 700 kPa, 800 kPa, 900 kPa, or 1,000 kPa. In addition, the adhesive film may have a storage modulus at −20° C. ranging from any one of these numerical values to any other one of these numerical values. For example, the adhesive film may have a storage modulus at −20° C. of about 10 kPa to about 1,000 kPa, about 10 kPa to about 500 kPa, about 20 kPa to about 500 kPa, or about 20 kPa to about 100 kPa. Within these ranges, the adhesive film exhibits viscoelasticity at low temperature and a good recovery rate.

In addition, a ratio of the storage modulus at 80° C. to the storage modulus at −20° C. of the adhesive film may be about 1:1 to about 1:10, for example about 1:1 to about 1:8, or about 1:1 to about 1:5. Within these ranges, the adhesive film does not suffer from (or suffers from a reduced amount of) deterioration in adhesion between adherends over a wide temperature range (about −20° C. to about 80° C.) and can be used for flexible optical members.

Since the adhesive film includes the organic particles, the adhesive film is flexible even at low temperature (about −20° C.), can maintain a storage modulus suitable for flexible devices, exhibits good viscoelasticity at low temperature (about −20° C.) and/or room temperature (about 25° C.), and exhibits stable viscoelasticity even at high temperature (about 80° C.). The adhesive film including the organic particles allows the organic particles to suppress coagulation between matrices as compared with an adhesive film including only the hydroxyl group-containing (meth)acrylic copolymer. As such, the adhesive film exhibits good wettability on an adherend. Thus, small bubbles generated due to folding disappear as the adherend is unfolded or the ambient temperature changes. In addition, although the adhesive film includes the organic particles, there is a difference in the index of refraction between the organic particles having a specific average particle size and the hydroxyl group-containing (meth)acrylic copolymer. As such, the adhesive film can have good transparency. Therefore, since the adhesive film maintains viscoelasticity over a wide temperature range, the adhesive film exhibits good foldability and can be used for flexible optical members.

The adhesive film having a thickness of about 100 μm may have a haze of about 5% or less, for example about 3% or less, or about 2% or less, which may be as measured after the adhesive film is subjected to about 200% stretching. Within these ranges, the adhesive film exhibits good transparency when used in displays.

The adhesive film having a thickness of about 100 μm may have a recovery rate of about 30% to about 98%, for example about 40% to about 95%, or about 50% to about 83%, as represented by Equation 3. Within these ranges, the adhesive film can be used for optical displays and has a long lifespan.

$$\text{Recovery rate } (\%) = (1 - (X_f/X_0)) \times 100 \qquad \text{Equation 3}$$

In Formula 3, $X_0$ and $X_f$ are defined as follows. The two ends of a polyethylene terephthalate (PET) film are defined as the first end and the second end, and a specimen is prepared by bonding the ends of two PET films to each other via an adhesive film (length×width: about 20 mm×about 20 mm, thickness: about 75) to form a first end of first PET film/adhesive film/second end of second PET film structure. Next, jigs are secured to the non-bonded ends of the PET films of the specimen at room temperature (25° C.). Next, the jig at one side is kept fixed while the jig at the other side is pulled to a length of 1,000% of the thickness (unit: μm) of the adhesive film (10 times the initial thickness ($X_0$) at a rate of about 300 mm/min) and then maintained in that position for 10 seconds. Then, the adhesive film is recovered at the same rate (about 300 mm/min) as the pulling rate, followed by application of a force of 0 kPa to the adhesive film. The increased length of the adhesive film is defined as $X_f$ (unit: μm).

In some embodiments, the adhesive film (thickness: about 100 μm) may have a recovery rate of about 50% to about 95%, for example, about 55% to about 90%. Within these ranges, the adhesive film does not suffer from (or suffers from a reduced amount of) deformation even when the film is folded hundreds of thousands of times, and the adhesive film can therefore prevent or reduce deformation of the adherend.

In some embodiment, the adhesive film (thickness: about 100 μm) may have a recovery rate of about 45% to about 80%, for example, about 49% to about 75%. Within these ranges, the adhesive film uniformly disperses the stress on the adherends when folded, and the adhesive film therefore exhibits good reliability.

The adhesive film (length×width×thickness: about 13 cm×about 3 cm×about 100 μm) may have a bubble generation area of about 0%, as measured when the adhesive film is aged at 70° C. and 93% RH for 24 hours. Within this range, the adhesive film does not suffer from (or suffers from a reduced amount of) detachment from the adherend even at high temperature and high humidity.

The "bubble generation area" refers to a value (%) measured according to the following procedure. An adhesive film (length×width×thickness: about 13 cm×about 3 cm×about 100 μm) including a PET film (about 50 μm thick) stacked on one surface thereof and a PET film (about 100 μm thick) stacked on the other surface thereof is folded in half towards the 50 μm thick PET film such that the length of the adhesive film is cut in half. The folded film is then placed between parallel frames having a gap of about 1 cm. Next, the adhesive film is aged at 70° C. and 93% RH for 24 hours, followed by analysis of the image, which is obtained through observation of portions of the adhesive film suffering from bubbles using an optical microscope (EX-51, Olympus Co., Ltd., magnification: 30×) and Mac-View software (Mountech Co., Ltd.) to measure the ratio of area occupied by bubbles to the total area of the adhesive film.

The adhesive film is an adhesive layer that may be attached to one or both surfaces of an optical film, and may be used in attaching glass, substrates, electrodes of touch panels, LCD/OLED modules, touch panels, optical films and/or the like to each other.

For example, the adhesive film may be used as an optically clear adhesive film or a touch panel film.

The adhesive film may have a thickness (excluding a release film) of about 1 μm to about 2.0 mm, for example about 20 μm to about 1.0 mm, or about 50 μm to about 1.0 mm, but the adhesive film is not limited thereto. Within these ranges, the adhesive film can be used for optical displays.

Display Member

According to some embodiments of the present invention, a display member may include an optical film and the above described adhesive film attached to one or both surfaces of the optical film.

Figure 1:
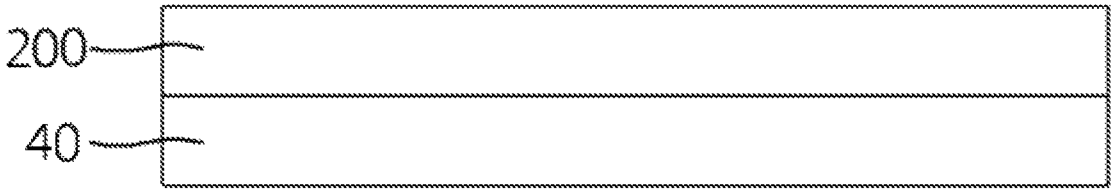
FIG. 1 is a schematic cross-sectional view of a display member according to embodiments of the present invention.

FIG. 1 is a schematic cross-sectional view of a display member according to embodiments of the present invention. Referring to FIG. 1, the display member may include an optical film 40 and an adhesive layer or an adhesive film formed on one surface of the optical film 40. Reference numeral 200 in FIG. 1 may represent the adhesive layer or the adhesive film.

In some embodiments, the display member may include the optical film 40 and an adhesive layer 200 formed on one or both surfaces of the optical film 40.

The adhesive layer may be formed of the adhesive composition according to embodiments of the present invention. For example, the adhesive composition (which is prepared by mixing and polymerizing a monomer mixture for forming a hydroxyl group-containing (meth)acrylic copolymer, organic particles and a photopolymerization initiator, followed by adding an additional photopolymerization initiator to the polymer) may be coated onto the optical film 40, thereby forming the adhesive layer.

In some embodiments, the display member may include an optical film 40 and the adhesive film 200 according to embodiments of the present invention, which is formed on one or both surfaces of the optical film 40.

Examples of the optical film may include touch panels, windows, polarizing plates, color filters, retardation films, elliptical polarizing films, reflective films, anti-reflective films, compensation films, brightness improving films, alignment films, optical diffusion films, glass shatter-proof films, surface protective films, OLED device barrier layers, plastic LCD substrates, indium tin oxide (ITO)-containing films, fluorinated tin oxide (FTO)-containing films, aluminum-doped zinc oxide (AZO)-containing films, carbon nanotubes (CNTs)-containing films, Ag nanowires-containing films, transparent electrode films such as graphene, and/or the like. The optical film can be manufactured by those of ordinary skill in the art.

For example, a touch panel may be attached to a window or an optical film via the adhesive film, thereby forming a display member. Alternatively, the adhesive film may be applied to any suitable polarizing plate. For example, the display member may include a capacitive mobile phone as an optical display.

In some embodiments, the display member may be a display member in which a first adhesive film, a touch functional unit, a second adhesive film and a window film are sequentially stacked on an optical device.

The optical device may include an OLED, an LED or a light source, and the first and/or second adhesive film may be the adhesive film according to embodiments the present invention. The touch functional unit may be a touch panel, but is not limited thereto.

In addition, the window film may be formed of an optically transparent and flexible resin. For example, the window film may include a base layer and a hard coating layer.

The base layer may be formed of at least one resin selected from polyester resins such as polyethylene terephthalate polyethylene naphthalate, polybutylene terephthalate and polybutylene naphthalate; polycarbonate resins; polyimide resins; polystyrene resins; and/or poly(meth)acrylate resins such as polymethylmethacrylate.

The hard coating layer may have a pencil hardness of about 6H and may be formed of a siloxane resin.

In some embodiments, the display member may include: a liquid crystal panel in which a polarizer is stacked on both surfaces of an LCD cell; a double-sided adhesive tape (DAT) bonding functional films (for example, anti-reflective films) to each other; and a touch panel unit formed on the functional films. The touch panel unit includes: a first adhesive film; a first transparent electrode film stacked on the first adhesive film; a second adhesive film; and a second transparent electrode film. An electrode and an overcoating layer for the electrode are formed on the second transparent electrode film, and a third adhesive film and a window glass are stacked on the overcoating layer in that order. Any air gap may be removed upon lamination.

Hereinafter, embodiments of the present invention will be described with reference to some examples. It should be understood that these examples are provided for illustration only and are not to be construed in any way as limiting the present invention. Also, a description of details that would be apparent to those skilled in the art will be omitted for clarity.

EXAMPLE (A) Monomer Mixture
- (a1) 2-ethylhexyl acrylate (EHA) was used.
- (a2) 4-hydroxybutyl acrylate (HBA) was used.

(B) Organic Particles
- (b1) Organic particles were used that had a core-shell structure composed of a core of polybutyl acrylate (PBA) and a shell of polymethylmethacrylate (PMMA), included 40 wt % of the shell, and had an average particle diameter of 230 nm and an index of refraction (NB) of 1.48.
- (b2) Organic particles were used that had a core-shell structure composed of a core of polybutyl acrylate (PBA) and a shell of polymethylmethacrylate (PMMA), included 30 wt % of the shell, and had an average particle diameter of 230 nm and an index of refraction (NB) of 1.48.
- (b3) Organic particles were used that had a core-shell structure composed of a core of polybutyl acrylate (PBA) and a shell of polymethylmethacrylate (PMMA), included 30 wt % of the shell, and had an average particle diameter of 130 nm and an index of refraction (NB) of 1.48.
- (b4) Organic particles were used that had a core-shell structure composed of a core of poly(2-ethylhexyl acrylate) (PEHA) and a shell of polymethylmethacrylate (PMMA), included 30 wt % of the shell, and had an average particle diameter of 140 nm and an index of refraction (NB) of 1.48.

(C) Initiator
- (c1) Irgacure 651 (2,2-dimethoxy-2-phenylacetophenone, BASF Co., Ltd.) was used as a radical photopolymerization initiator.
- (c2) Irgacure 184 (1-hydroxycyclohexyl phenyl ketone, BASF Co., Ltd.) was used as a radical photopolymerization initiator.
- (c3) Azobisisobutyronitrile (AIBN, Junsei Co., Ltd.) was used as a thermal polymerization initiator.

Example 1

4 parts by weight of (b1) organic particles and 0.005 parts by weight of (c1) a photopolymerization initiator (Irgacure 651) were sufficiently mixed with 100 parts by weight of a monomer mixture (which included 70 wt % of (a1) 2-ethylhexyl acrylate and 30 wt % of (a2) 4-hydroxybutyl acrylate) in a glass container. Dissolved oxygen in the glass container was purged using nitrogen gas, followed by polymerizing the mixture through UV irradiation for a few minutes using a low-pressure lamp (BL lamp, Samkyo Co., Ltd.), thereby obtaining a hydroxyl group-containing (meth) acrylic copolymer having a viscosity of about 1,000 cPs and an index of refraction (NAB) as listed in Table 1. 0.35 parts by weight of (c2) an additional photopolymerization initiator (Irgacure 184) was added to the obtained hydroxyl group-containing (meth)acrylic copolymer, thereby preparing an adhesive composition.

The prepared adhesive composition was coated onto a polyester film (release film, polyethylene terephthalate film, thickness: 50 μm), thereby forming a 100 μm thick adhesive film. An upper side of the adhesive film was covered with a 75 μm thick release film, followed by irradiating both surfaces of the adhesive film with light for about 6 minutes using a low-pressure lamp (BL lamp, Samkyo Co., Ltd.), thereby obtaining a transparent adhesive sheet.

Examples 2 to 7 and Comparative Example 1

Transparent adhesive sheets were manufactured as in Example 1 except that the amount of each of the components in Example 1 was modified as listed in Table 1.

Example 8

4 parts by weight of (b3) organic particles and 0.05 parts by weight of (c3) a thermal polymerization initiator (AIBN, Junsei Co., Ltd.) were introduced into a glass container based on 100 parts by weight of a mixture including 80 wt % of (a1) 2-ethylhexyl acrylate and 20 wt % of (a2) 4-hydroxybutyl acrylate, followed by introducing 130 parts by weight of ethyl acetate to the glass container based on 100 parts by weight of the (A)+(b3) mixture. Next, the components were sufficiently mixed. Dissolved oxygen in the glass container was purged using nitrogen gas, followed by performing solution polymerization at 65° C., thereby obtaining a hydroxyl group-containing (meth)acrylic copolymer having an index of refraction (NAB) as listed in Table 1. 0.35 parts by weight of (c2) an additional photopolymerization initiator (Irgacure 184) was added to the obtained hydroxyl group-containing (meth)acrylic copolymer, thereby preparing an adhesive composition.

Next, a transparent adhesive sheet was manufactured as in Example 1, and additionally subjected to hot-air drying at 80° C. for 20 minutes and at 100° C. for 5 minutes.

The transparent adhesive sheets prepared in the Examples and Comparative Example were evaluated as to the properties listed in Table 1, and the results are shown in Table 1.

Evaluation of Properties (1) Storage modulus: Viscoelasticity was measured at a shear rate of 1 rad/sec at a strain of 1% under auto strain conditions using an ARES (MCR-501, Anton Paar Co., Ltd.) which is a dynamic viscoelasticity instrument. After removal of the release film, the adhesive film was stacked to a thickness of 500 μm. Next, the stacked body was subjected to punching using an 8 mm diameter puncher, thereby preparing a specimen. The storage modulus was measured on the specimen at a temperature of −60° C. to 90° C. at a heating rate of 5° C./min using an 8 mm jig, and the storage modulus at each of −20° C., 25° C. and 80° C. was recorded.

(2) Average slope: A temperature-dependent storage modulus distribution of the adhesive film was plotted in a graph in which the x-axis represents temperature (° C.) and the y-axis represents storage modulus (kPa). The average slope over a range of −20° C. to 80° C. was calculated by Equation 1:

$$\text{Average slope} = (Mo(80°\text{ C.}) - Mo(-20°\text{ C.}))/(80-(-20)) \quad \text{Equation 1}$$

In Equation 1, Mo(80° C.) is the storage modulus at 80° C., and Mo(−20° C.) is the storage modulus at −20° C.

(3) T-peel strength with respect to non-corona PET film: A PET film having a size of 150 mm×25 mm×75 μm (length×width×thickness) was prepared, and an adhesive film sample having a size of 100 mm×25 mm×100 μm (length×width×thickness) was obtained from each of the adhesive sheets of the Examples and Comparative Example. The PET films were laminated to both surfaces of the adhesive film sample, thereby preparing a specimen as shown in FIG. 2(*a*). The specimen was autoclaved at a pressure of 3.5 bar at 50° C. for 1,000 seconds and secured to a TA.XT_Plus texture analyzer (Stable Micro Systems Co., Ltd.). Referring to FIG. 2(*b*), the PET film at one side was kept fixed while the PET film at the other side was pulled at a rate of 50 mm/min at 25° C. using a TA.XT_Plus texture analyzer, thereby measuring T-peel strength at 25° C. (see FIG. 2(*b*)).

In addition, the PET film at one side was kept fixed while the PET film at the other side was pulled at a rate of 50 mm/min at 60° C. using a TA.XT_Plus texture analyzer, thereby measuring T-peel strength at 60° C.

(4) T-peel strength with respect to corona-treated PET film: A PET film having a size of 150 mm×25 mm×75 μm (length×width×thickness) was subjected to corona treatment twice (total dose: 156) under corona discharge at a dose of 78 using a corona treatment device. An adhesive film sample having a size of 100 mm×25 mm×100 μm (length×width×thickness) was obtained from each of the adhesive sheets of the Examples and Comparative Example. The corona-treated surfaces of the PET films were laminated to both surfaces of the adhesive film sample, thereby preparing a specimen as shown in FIG. 2(*a*). The specimen was autoclaved at a pressure of 3.5 bar at 50° C. for 1,000 seconds and secured to a TA.XT_Plus texture analyzer (Stable Micro Systems Co., Ltd.). Referring to FIG. 2(*b*), the PET film at one side was kept fixed while the PET film at the other side was pulled at a rate of 50 mm/min at 25° C. using a TA.XT_Plus texture analyzer, thereby measuring T-peel strength at 25° C. (see FIG. 2(*b*)).

In addition, the PET film at one side was kept fixed while the PET film at the other side was pulled at a rate of 50 mm/min at 60° C. using a TA.XT_Plus texture analyzer, thereby measuring T-peel strength at 60° C.

(5) Haze: A haze meter (NDH 5000, Nippon Denshoku Co., Ltd.) was used. Haze was measured on a specimen having a thickness of 100 μm in accordance with the American Society for Testing and Measurement (ASTM) D1003-95 standard (Standard Test for Haze and Luminous Transmittance of Transparent Plastic).

(6) Haze after 200% stretching: Both ends of a sample (5 cm×5 cm, thickness: 100 μm) of the manufactured adhesive film were secured to both sides of a horizontal tensile tester, followed by removal of the release films from both surfaces of the sample. After the sample was subjected to 200% stretching in a longitudinal direction (to a length twice the initial length, i.e., a length of 10 cm), a glass plate was placed on the lower side of the sample and a release film was placed on the upper side of the sample, followed by bonding the sample to the glass plate through 2 kg rollers, thereby preparing a stretched specimen. Next, the release film was removed from the upper side, followed by measuring the haze of the sample having a thickness of 100 μm in the manner described above.

(7) Recovery rate: Recovery rate was measured using the following procedures. The two ends of each polyethylene terephthalate (PET) film (thickness: 75 μm) having a size of 50 mm×20 mm (length×width) were defined as the first end and the second end, and a specimen was prepared by bonding the ends of two PET films to each other via each of the adhesive films (which were prepared in the Examples and Comparative Example and had a size of 20 mm×20 mm (length×width)) to form a first end of first PET film/adhesive film/second end of second PET film structure. The specimen had a contact area of 20 mm×20 mm (length×width) between each of the PET films and the adhesive film (see FIGS. 3(*a*) and 3(*b*)). Referring to FIG. 3(*a*), jigs were secured to the non-bonded ends of the PET films of the specimen at room temperature (25° C.). Next, the jig at one side was kept fixed, while the jig at the other side was pulled to a length of 1,000% of thickness (unit: μm) of the adhesive film (to a length of 10 times the initial thickness ($X_0$) of the adhesive film) at a rate of 300 mm/min, and then maintained in that position for 10 seconds. Next, a force of 0 kPa was applied to the adhesive film by recovering the adhesive film at the same rate (300 mm/min) as the pulling rate, and recovery rate (%) was calculated by Equation 3 (where $X_f$ (unit: μm) is the increased length of the adhesive film).

$$\text{Recovery rate }(\%)=(1-(X_f/X_0))\times 100 \qquad \text{Equation 3}$$

(8) Bubble generation area (%): An adhesive film (length×width×thickness: 13 cm×3 cm×100 μm) including a 50 μm thick PET film stacked on one surface thereof and a 100 μm thick PET film stacked on the other surface thereof was folded in half towards the 50 μm thick PET film such that the length of the adhesive film cut in half. Then, the adhesive film was placed between parallel frames having a gap of about 1 cm. Next, the adhesive film was aged at 70° C. and 93% RH for 24 hours, followed by analysis of the image, which was obtained through observation of the portions of the adhesive film suffering from bubbles using an optical microscope (EX-51, Olympus Co., Ltd., magnification: 30×) and Mac-View software (Mountech Co., Ltd.) to measure the ratio of area occupied by bubbles to the total area of the adhesive film.

TABLE 1

| | | Example | | | | | | | | Comp. |
|---|---|---|---|---|---|---|---|---|---|---|
| | | 1 | 2 | 3 | 4 | 5 | 6 | 7 | 8 | Example 1 |
| (A) | (a1) | 70 | 70 | 80 | 80 | 80 | 80 | 80 | 80 | 70 |
| | (a2) | 30 | 30 | 20 | 20 | 20 | 20 | 20 | 20 | 30 |
| (B) | (b1) (index of refraction: 1.48) | 4 | — | — | — | 4 | — | | | — |
| | (b2) (index of refraction: 1.48) | — | 4 | — | — | — | 4 | | | — |
| | (b3) (index of refraction: 1.48) | — | — | 4 | — | — | — | 2 | 4 | — |

TABLE 1-continued

| | | | Example | | | | | | | | Comp. |
|---|---|---|---|---|---|---|---|---|---|---|---|
| | | | 1 | 2 | 3 | 4 | 5 | 6 | 7 | 8 | Example 1 |
| | (b4) (index of refraction: 1.48) | | — | — | — | 4 | — | — | | | — |
| Index of refraction of hydroxyl group-containing (meth)acrylic copolymer ($N_{AB}$) | | | 1.47 | 1.47 | 1.48 | 1.48 | 1.48 | 1.48 | 1.48 | 1.48 | 1.47 |
| $\lvert N_{AB} - N_B \rvert$ | | | 0.01 | 0.01 | 0 | 0 | 0 | 0 | 0 | 0 | — |
| (C) | (c1) | | 0.005 | 0.005 | 0.005 | 0.005 | 0.005 | 0.005 | 0.005 | — | 0.005 |
| | (c2) | | 0.35 | 0.35 | 0.35 | 0.35 | 0.35 | 0.35 | 0.35 | 0.35 | 0.35 |
| | (c3) | | — | — | — | — | — | — | — | 0.05 | |
| Storage modulus (kPa) | | −20° C. | 130 | 110 | 73 | 61 | 80 | 71 | 74 | 65 | 86 |
| | | 25° C. | 34 | 33 | 27 | 28 | 37 | 35 | 27 | 25 | 22 |
| | | 80° C. | 18 | 23 | 15 | 18 | 33 | 29 | 14 | 18 | 6 |
| Average slope | | | −1.12 | −0.87 | −0.58 | −0.43 | −0.47 | −0.42 | −0.60 | −0.47 | −0.80 |
| T-peel strength with respect to non-corona-treated PET film (gf/in) | | 25° C. | 325 | 296 | 323 | 363 | 380 | 380 | 569 | 254 | 316 |
| | | 60° C. | 266 | 281 | 198 | 266 | 404 | 254 | 472 | 301 | 234 |
| T-peel strength with respect to corona-treated PET film (gf/in) | | 25° C. | 990 | 943 | 1073 | 881 | 1268 | 944 | 1105 | 984 | 483 |
| | | 60° C. | 536 | 532 | 578 | 654 | 561 | 596 | 521 | 587 | 472 |
| Haze (%) | | | 0.78 | 0.49 | 0.51 | 0.44 | 0.92 | 0.49 | 0.28 | 0.52 | 0.45 |
| Haze after 200% stretching (%) | | | 0.97 | 0.62 | 0.55 | 0.45 | 1.26 | 0.67 | 0.37 | 0.54 | 0.47 |
| Recovery rate (%) | | | 79.5 | 78.0 | 67.2 | 49.1 | 82.5 | 74 | 50.0 | 77.5 | 38.4 |
| Bubble generation area (%) | | | 0 | 0 | 0 | 0 | 0 | 0 | 0 | 0 | 2.19 |

In Table 1, the amounts of (a1) and (a2) in the monomer mixture ((a1)+(a2)) are given in units of wt %, and the amounts of (B) and (C) are given in units of parts by weight based on 100 parts by weight of the monomer mixture. In addition, INAB-NBI represents the difference in the index of refraction between the organic particles and the hydroxyl group-containing (meth)acrylic copolymer. The index of refraction is rounded off to three decimal places.

As shown in Table 1, the adhesive films of Examples 1 to 8 (including the organic particles) had storage moduli allowing the adhesive films to maintain viscoelasticity over a wide temperature range, and exhibited similar viscoelasticity over a wide temperature range due to small average slopes of the storage moduli over a range of −20° C. to 80° C. In addition, the adhesive films of Examples 1 to 8 exhibited low haze (transparency) and good adhesion, as well as good recovery rate, bubble generation area (%) in high temperature and high humidity environments, and the like.

On the other hand, the adhesive film of Comparative Example 1 (not including the organic particles) exhibited deteriorated adhesion and storage modulus at high-temperature, and deteriorated recovery rate and bubble generation area, as compared with the adhesive films according to embodiments of the present invention.

Although certain embodiments of the present invention have been illustrated and described, it should be understood that the disclosed embodiments are provided for illustration only and are not to be construed in any way as limiting the invention. Indeed, various modifications, changes, alterations, and equivalent embodiments can be made by those skilled in the art without departing from the spirit and scope of the invention.

Additionally, although specific terms may be employed in this disclosure, these terms are used and are to be interpreted in a generic and descriptive sense only and not for purposes of limitation. In some instances, as would be apparent to those of ordinary skill in the art, features, characteristics, and/or elements described in connection with a particular embodiment may be used alone or in combination with features, characteristics, and/or elements described in connection with other embodiments unless specifically indicated otherwise. Accordingly, it will be understood by those of ordinary skill in the art that various changes in form and detail may be made without departing from the spirit and scope of the present invention as set forth in the following claims.

What is claimed is:

1. An adhesive film having an average slope of −5.0 to 0, as measured over a temperature range of −20° C. to 80° C. in a graph of storage modulus versus temperature in which the x-axis represents temperature (° C.) and the y-axis represents the storage modulus (kPa), the adhesive film having a storage modulus at 25° C. of 10 kPa to 500 kPa, and the adhesive film having a storage modulus at 80° C. of 10 kPa to 1,000 kPa, wherein the adhesive film is formed from an adhesive composition comprising a monomer mixture configured to form a (meth)acrylic copolymer having a glass transition temperature of about −150° C. to about −13° C., at least one of an initiator or a crosslinking agent, and optionally organic particles, the monomer mixture consists of a hydroxyl group-containing (meth)acrylate monomer and a comonomer, a homopolymer of the comonomer has a glass transition temperature of about −150° C. to about 0° C., and optionally a carboxyl group-containing monomer, and wherein the comonomer is selected from the group consisting of linear or branched alkyl (meth)acrylate monomers, ethylene oxide-containing monomers, propylene oxide-containing monomers, amine group-containing monomers, alkoxy group-containing monomers, phosphoric acid group-containing monomers, sulfonic acid group-containing monomers, phenyl group-containing monomers, silane group-containing monomers, and combinations thereof.

2. The adhesive film according to claim 1, wherein the adhesive film has a T-peel strength of about 200 gf/in to about 3,000 gf/in, as measured at 25° C. with respect to a non-corona-treated polyethylene terephthalate (PET) film.

3. The adhesive film according to claim 1, wherein the adhesive film has a T-peel strength of about 100 gf/in to about 2,000 gf/in, as measured at 60° C. with respect to a non-corona-treated polyethylene terephthalate (PET) film.

4. The adhesive film according to claim 1, wherein the adhesive film has a T-peel strength of about 400 gf/in to about 4,000 gf/in, as measured at 25° C. with respect to a corona-treated polyethylene terephthalate (PET) film.

5. The adhesive film according to claim 1, wherein the adhesive film has a T-peel strength of about 200 gf/in to about 2,000 gf/in, as measured at 60° C. with respect to a corona-treated polyethylene terephthalate (PET) film.

6. The adhesive film according to claim 1, wherein the monomer mixture consists of about 5 wt % to about 40 wt % of the hydroxyl group-containing (meth)acrylate monomer and about 60 wt % to 95 wt % of the comonomer based on a total amount of the monomer mixture.

7. The adhesive film according to claim 1, wherein the monomer mixture further includes the carboxyl group-containing monomer.

8. The adhesive film according to claim 1, wherein the adhesive composition further includes a silane coupling agent.

9. The adhesive film according to claim 1, wherein the adhesive film having a thickness of about 100 μm has a haze of about 5% or lower.

10. The adhesive film according to claim 1, wherein the adhesive film having a thickness of about 100 μm has a haze of about 5% or lower, which is measured after the adhesive film is subjected to about 200% stretching.

11. The adhesive film according to claim 1, wherein the adhesive film having a thickness of about 100 μm has a recovery rate of about 30% to about 98%, as calculated by Equation 3:

$$\text{Recovery rate } (\%) = (1-(X_f/X_0))\times 100 \quad \text{Equation 3}$$

wherein $X_0$ is an initial thickness of the adhesive film and $X_f$ is an increased length of the adhesive film after a specimen comprising a first end of a first PET film attached to the adhesive film which is attached to a second end of a second PET film is pulled to a length of 10 times the initial thickness ($X_0$) of the adhesive film at a rate of about 300 mm/min, maintained in that position for 10 seconds, and then recovered at a rate the same as the pulling rate, followed by application of a force of 0 kPa to the adhesive film.

12. The adhesive film according to claim 1, wherein the adhesive film has a bubble generation area of about 0%, as measured by folding in half an adhesive film specimen comprising a first PET film having a thickness of about 50 μm stacked on one surface of the adhesive film and a second PET film having a thickness of about 100 μm stacked on a second surface of the adhesive film, followed by placing the adhesive film specimen between parallel frames having a gap of about 1 cm, and then aging the adhesive film specimen at about 70° C. and about 93% RH for about 24 hours.

13. The adhesive film according to claim 1, wherein the adhesive film is an adhesive film cured by UV irradiation.

14. The adhesive film according to claim 1, wherein the adhesive composition further includes the organic particles.

15. The adhesive film according to claim 14, wherein the organic particles have an average particle diameter of about 10 nm to about 400 nm.

16. The adhesive film according to claim 14, wherein the organic particles have a core-shell structure in which the core and the shell have glass transition temperatures satisfying Equation 2:

$$Tg(c)<Tg(s) \quad \text{Equation 2}$$

wherein Tg(c) is the glass transition temperature (° C.) of the core and Tg(s) is the glass transition temperature (° C.) of the shell.

17. The adhesive film according to claim 14, wherein the organic particles are present in an amount of about 0.1 parts by weight to about 15 parts by weight based on 100 parts by weight of the monomer mixture forming the (meth)acrylic copolymer.

18. The adhesive film according to claim 14, wherein a difference in index of refraction between the organic particles and the (meth)acrylic copolymer is about 0.5 or less.

19. A display member comprising:
an optical film; and
the adhesive film according to claim 1 attached to one or both surfaces of the optical film.

20. An adhesive film having an average slope of −5.0 to 0, as measured over a temperature range of −20° C. to 80° C. in a graph of storage modulus versus temperature in which the x-axis represents temperature (C) and the y-axis represents the storage modulus (kPa),
the adhesive film having a storage modulus at 80° C. of 10 kPa to 1,000 kPa,
the adhesive film is formed from an adhesive composition comprising a monomer mixture configured to form a (meth)acrylic copolymer having a glass transition temperature of about −150° C. to about −13° C., the monomer mixture comprising a comonomer, a homopolymer of the comonomer has a glass transition temperature of about −150° C. to about 0° C., and
the adhesive film having a storage modulus at 25° C. of 10 kPa to 70 kPa,
wherein the adhesive composition further includes at least one of an initiator and a crosslinking agent, and optionally organic particles.

21. The adhesive film according to claim 20, wherein the adhesive film has a T-peel strength of about 400 gf/in to about 4,000 gf/in, as measured at 25° C. with respect to a corona-treated polyethylene terephthalate (PET) film.

22. The adhesive film according to claim 20, wherein the adhesive film has a T-peel strength of about 200 gf/in to about 2,000 gf/in, as measured at 60° C. with respect to a corona-treated polyethylene terephthalate (PET) film.

23. The adhesive film according to claim 20, wherein the adhesive composition further includes the organic particles.

24. The adhesive film according to claim 20, wherein the adhesive film having a thickness of about 100 μm has a recovery rate of about 30% to about 98%, as calculated by Equation 3:

$$\text{Recovery rate } (\%) = (1-(X_f/X_0))\times 100 \quad \text{Equation 3}$$

wherein $X_0$ is an initial thickness of the adhesive film and $X_f$ is an increased length of the adhesive film after a specimen comprising a first end of a first PET film attached to the adhesive film which is attached to a second end of a second PET film is pulled to a length of 10 times the initial thickness ($X_0$) of the adhesive film at a rate of about 300 mm/min, maintained in that position for 10 seconds, and then recovered at a rate the same as the pulling rate, followed by application of a force of 0 kPa to the adhesive film.

25. The adhesive film according to claim 20, wherein the monomer mixture comprises a hydroxyl group-containing (meth)acrylate.

26. The adhesive film according to claim 25, wherein the monomer mixture comprises about 5 wt % to about 40 wt % of the hydroxyl group-containing (meth)acrylate monomer and about 60 wt % to 95 wt % of the comonomer based on a total amount of the monomer mixture.

* * * * *